United States Patent
Hikmet et al.

(10) Patent No.: US 11,598,995 B2
(45) Date of Patent: Mar. 7, 2023

(54) BEAM SHAPING DEVICE

(71) Applicant: KONINKLIJKE PHILIPS N.V., Eindhoven (NL)

(72) Inventors: Rifat Ata Mustafa Hikmet, Eindhoven (NL); Ties van Bommel, Eindhoven (NL); Thomas Caspar Kraan, Eindhoven (NL); Leon Hendrikus Christiaan Kusters, Eindhoven (NL); Siebe Tjerk DeZwart, Eindhoven (NL); Oscar Hendrikus Willemsen, Eindhoven (NL); Marcellinus Petrus Carolus Michael Krijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 343 days.

(21) Appl. No.: 16/599,181

(22) Filed: Oct. 11, 2019

(65) Prior Publication Data
US 2020/0041852 A1 Feb. 6, 2020

Related U.S. Application Data

(63) Continuation of application No. 12/595,250, filed as application No. PCT/IB2008/051401 on Apr. 14, 2008, now abandoned.

(30) Foreign Application Priority Data

Apr. 17, 2007 (EP) .................................. 07106290
Jun. 1, 2007 (EP) .................................. 07109465

(51) Int. Cl.
*G02F 1/1343* (2006.01)
*G02B 30/26* (2020.01)
(Continued)

(52) U.S. Cl.
CPC ....... *G02F 1/134363* (2013.01); *G02B 30/26* (2020.01); *G02F 1/134372* (2021.01);
(Continued)

(58) Field of Classification Search
CPC ......... G02F 1/134363; G02F 1/134372; G02F 1/134381; G02B 30/26
See application file for complete search history.

(56) References Cited

U.S. PATENT DOCUMENTS

| 4,836,657 A | 6/1989 | Gunji |
| 5,493,426 A | 2/1996 | Johnson et al. |

(Continued)

FOREIGN PATENT DOCUMENTS

| EP | 0822441 A2 | 2/1998 |
| GB | 1516976 A | 7/1978 |

(Continued)

OTHER PUBLICATIONS

Schematic—Definition, Meaning & Synonyms_Vocabulary.com.*

*Primary Examiner* — Dung T Nguyen

(57) ABSTRACT

A beam shaping device (1; 31) comprising first (3; 33) and second (4; 37) optically transparent substrates, a liquid crystal layer (2; 36) sandwiched there between, and first (5; 34) and second (6; 35) electrodes arranged on a side of the liquid crystal layer (2; 36) facing the first substrate (3; 34). The beam shaping device (1; 31) is controllable between beam-shaping states, each permitting passage of light through the beam-shaping device in a direction perpendicular thereto. The beam shaping device (1; 31) is configured in such a way that application of a voltage (V) across the first (5; 34) and second (6; 35) electrodes results in an electric field having a portion essentially parallel to the liquid crystal layer (2; 36) in a segment thereof between neighboring portions of the electrodes (5, 6; 34; 35) and extending substantially from the first substrate (3; 34) to the second (4;

(Continued)

35) substrate. In this way a relatively high refractive index gradient can be obtained across short distances, which enables a very efficient beam shaping. The electric field can be achieved by utilizing electrodes provided on one side of the liquid crystal layer, in a so-called in-plane configuration. The device can be used in an autostereoscopic display device, for switching between 2D and 3D modes.

30 Claims, 21 Drawing Sheets

(51) Int. Cl.
  *G02F 1/29* (2006.01)
  *H04N 13/359* (2018.01)
(52) U.S. Cl.
  CPC .......... *G02F 1/134381* (2021.01); *G02F 1/29* (2013.01); *H04N 13/359* (2018.05)

(56) References Cited

U.S. PATENT DOCUMENTS

| | | |
|---|---|---|
| 6,005,650 A | 12/1999 | Kim |
| 6,061,179 A * | 5/2000 | Inoguchi .............. H04N 13/307 359/464 |
| 6,069,650 A | 5/2000 | Battersby |
| 6,388,730 B1 | 5/2002 | Lindquist |
| 6,469,765 B1 | 10/2002 | Matsuyama et al. |
| 6,661,492 B2 | 12/2003 | Kim |
| 6,791,658 B2 | 9/2004 | Murayama |
| 6,819,384 B2 | 11/2004 | Nakanishi |
| 6,862,063 B2 | 3/2005 | Shim |
| 7,113,243 B2 | 9/2006 | Jeong et al. |
| 7,369,204 B1 | 5/2008 | Choi et al. |
| 7,965,364 B2 | 6/2011 | Lin et al. |
| 7,995,181 B2 | 8/2011 | Choi |
| 8,233,125 B2 | 7/2012 | Yuh |
| 8,330,881 B2 | 12/2012 | Krijn et al. |
| 2002/0097365 A1 | 7/2002 | Yang et al. |
| 2002/0131006 A1 | 9/2002 | Vang |
| 2002/0176043 A1 | 11/2002 | Fukami |
| 2003/0021534 A1 | 1/2003 | Fujieda |
| 2003/0063186 A1 | 4/2003 | Tomono |
| 2004/0263749 A1 | 12/2004 | Jeong |
| 2005/0024548 A1 | 2/2005 | Choi et al. |
| 2005/0248705 A1 | 11/2005 | Smith et al. |
| 2006/0082519 A1 | 4/2006 | Nam et al. |
| 2006/0114389 A1 | 6/2006 | Lin |
| 2007/0008617 A1 | 1/2007 | Shestak et al. |

FOREIGN PATENT DOCUMENTS

| | | |
|---|---|---|
| JP | 07043656 A | 2/1995 |
| JP | 2003091013 A | 3/2003 |
| JP | 2005134663 A | 5/2005 |
| WO | 2007039846 A2 | 4/2007 |
| WO | 2008126049 A1 | 10/2008 |

* cited by examiner

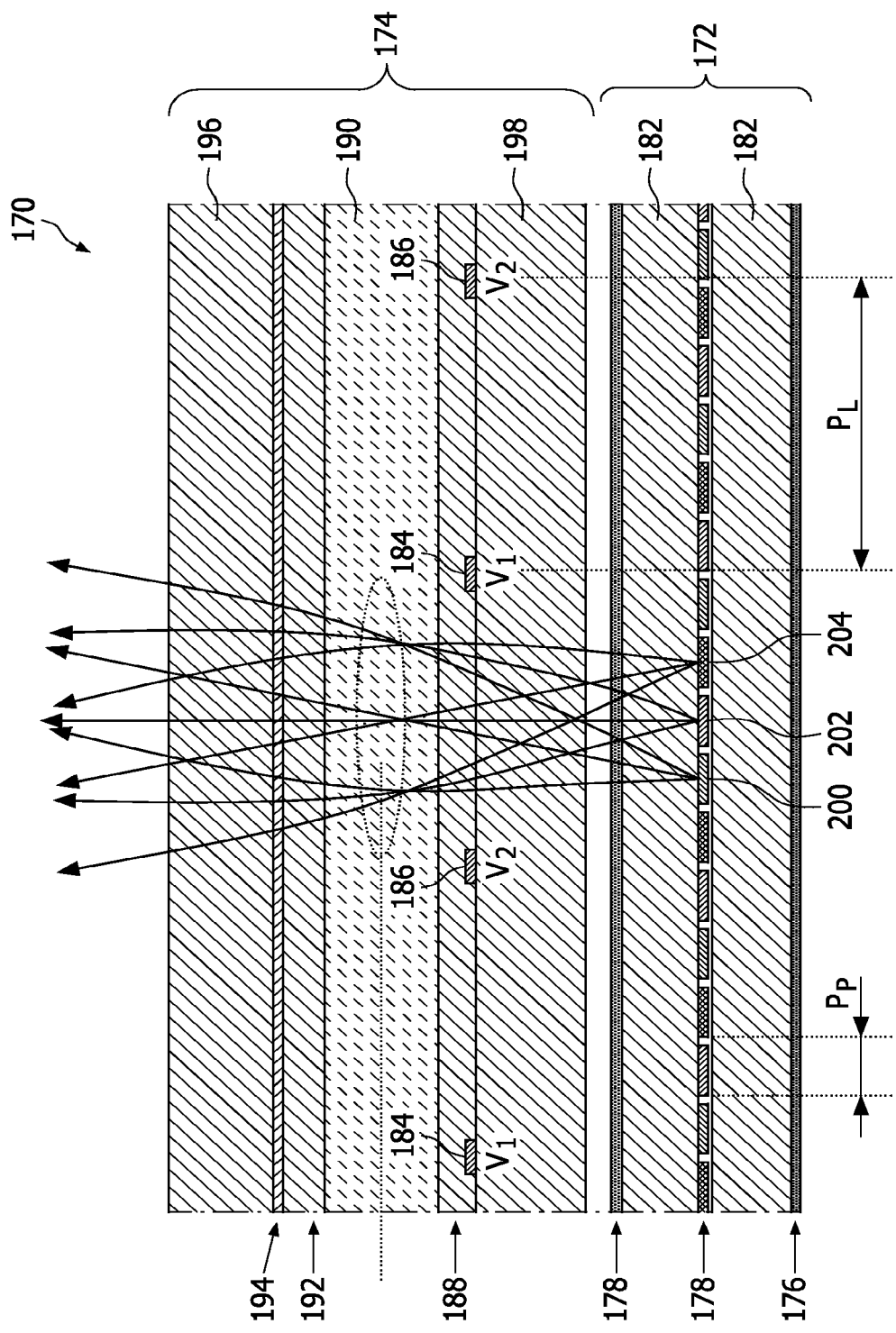

BEAM SHAPING DEVICE

CROSS-REFERENCE TO RELATED APPLICATIONS

The present application is a continuation application under 37 C.F.R. § 1.53(b) of U.S. patent application Ser. No. 12/595,250 filed on Dec. 10, 2009, which is the U.S. National Phase application, under 35 U.S.C. § 371 of International Application No. PCT/IB2008/051401, filed on Apr. 14, 2008, which claims the benefit of EP Patent Application No. EP 07109465.0, filed on Jun. 1, 2007 and EP 07106290.5 filed Apr. 17, 2007. Priority under 35 U.S.C. § 120 is claimed from U.S. patent application Ser. No. 12/595,250, and the entire disclosure of the prior applications are specifically incorporated herein by reference.

TECHNICAL FIELD

The present invention relates to a beam shaping device which is controllable between beam-shaping states, each permitting passage of light through the beam-shaping device in a direction perpendicular thereto.

BACKGROUND

Active beam shaping is useful for various applications ranging from general lighting to special lighting applications, such as a video flash in which the zoom function of the camera is coupled to the beam width control function of an active optical element. Liquid crystal optics would appear to be suitable for this purpose. The alignment orientation of liquid crystal molecules in a liquid crystal cell can be controlled by applying an electric field thereto. This reorientation of the liquid crystal molecules results in a refractive index gradient, which leads to a light ray passing through the liquid crystal cell being redirected. Hereby, the direction and/or shape of a light beam can be controlled electrically.

One application of beam shaping devices of particular interest is in the field of autostereoscopic display devices, which include a display panel having an array of display pixels for producing a display and an imaging arrangement for directing different views to different spatial positions. It is well known to use an array of elongate lenticular elements which are provided extending parallel to one another and overlying the display pixel array as the imaging arrangement, and the display pixels are observed through these lenticular elements.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

One way to implement this is to provide an electrically switchable lenticular array. In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device can be formed as a beam shaping arrangement of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer.

A more detailed description of the structure and operation of the switchable device can be found in U.S. Pat. No. 6,069,650.

The known use of switchable liquid crystal materials for switchable 2D/3DD displays uses a replica technique to form the lens shapes, which are then filled with liquid crystal material. This process is not compatible with the other processing steps associated with the LCD fabrication process, and therefore adds significantly to the cost of producing the display device.

A more general example of liquid crystal optics is disclosed in JP 07-043656, where a light beam coupler is arranged to align a light beam to a selected optical fiber and to adjust the beam spot size. In the coupler, a liquid crystal layer is provided between transparent substrates. One of the substrates is provided with a ground plane, and the other substrate is provided with a number of individually controllable electrodes. By varying the potential of the electrodes in relation to the ground plane a light beam passing through the coupler is aligned to hit a selected optical fiber.

Although being capable of deflecting a light beam a short distance, the device disclosed in JP 07-043656 appears unsuitable for more macroscopic beam shaping applications, where a large beam divergence and/or convergence is typically desired.

SUMMARY OF THE INVENTION

In view of the above-mentioned and other drawbacks of the prior art, a general object of the present invention is to provide an improved beam shaping device, in particular a beam shaping device capable of more efficiently diverging and/or converging a light beam.

According to the present invention, these and other objects are achieved through a beam shaping device comprising first and second optically transparent substrates, a liquid crystal layer sandwiched there between, and first and second electrodes arranged on a side of the liquid crystal layer facing the first substrate, wherein the beam shaping device is controllable between beam-shaping states, each permitting passage of light through the beam-shaping device in a direction perpendicular to the liquid crystal layer, wherein the beam shaping device is configured in such a way that application of a voltage across the first and second electrodes results in an electric field including a portion essentially parallel to the liquid crystal layer in a segment thereof between neighboring portions of the electrodes and extending substantially from the first substrate to the second substrate.

The liquid crystal layer may comprise any kind of liquid crystal molecules, and may be in any one of its phases. The nematic phase is, however, preferred due to its relatively low viscosity as compared with other liquid crystal phases such as the smectic phase. In this way shorter switching times can be obtained. The liquid crystal layer may further comprise a liquid crystal composite containing polymers.

By an "optically transparent" medium should be understood a medium which permits at least partial transmission of light (electromagnetic radiation including the visible spectrum, infrared and ultra violet light).

The optically transparent substrates may be rigid or flexible and may, for example by made of glass or a suitable plastic material, such as poly-methyl methacrylate (PMMA)

The electrodes may be formed either on the surface of the substrate or embedded in the substrate. They may be formed in any electrically conductive material, preferably, however, in an optically transparent conductive material, such as indium tin oxide (ITO) or indium zinc oxide (IZO).

As is well known from the theory of inhomogeneous optical materials, a ray of light encountering a refractive index gradient will bend towards a region with a higher refractive index. In a liquid crystal layer, the refractive index, and thereby the bending of a ray of light, can be controlled by reorienting the liquid crystal molecules comprised in the liquid crystal layer by application of an electric field.

The present invention is based on the realization that a larger refractive index gradient, and thereby a more efficient beam shaping can be achieved by forming an electric field in the liquid crystal layer, which is essentially parallel to the liquid crystal layer in a region located between adjacent electrodes and substantially extending throughout the liquid crystal (LC) layer between the substrates. As liquid crystal molecules tend to follow the electric field lines, a gradual transition in orientation of liquid crystal molecules, for example from perpendicular to the LC layer in the vicinity of the first electrode to parallel to the LC layer between the first and second electrodes to perpendicular to the LC layer in the vicinity of the second electrode, can be achieved between neighboring portions of the electrodes. In this way a relatively high refractive index gradient can be obtained across short distances, which enables a very efficient beam shaping.

The present inventors have further found that such an advantageous electric field can be achieved by utilizing electrodes provided on one side of the LC layer, in a so-called in-plane configuration.

Utilizing this configuration, it has been found that very efficient beam divergence/convergence can be achieved. For example, experiments have shown that a collimated beam can be diverged to angles in excess of 60°, which is far in excess of what can be accomplished through prior art arrangements.

Additionally, a more efficient throughput of light can be achieved through the present invention, since the electrode on the second substrate according to the prior art is no longer required. Since the reflection losses associated with a continuous transparent electrode layer is typically around 5% at a wavelength of 500 nm, correspondingly less light is lost using the configuration according to the present invention.

The first electrode may advantageously comprise a first set of essentially parallel first electrode conductor lines, and the second electrode comprise a first set of essentially parallel second electrode conductor lines, the first and second electrodes being arranged such that at least one conductor pair including neighboring first and second electrode conductor lines is formed.

The conductor lines may have any shape, curved, straight, undulating etc.

Through this electrode configuration, a large co-operating beam-shaping area can be achieved, and, thereby, beam-shaping of a relatively wide beam accomplished.

According to one embodiment, the first and second electrodes may each be comb-shaped and the "teeth" of these first and second comb-shaped electrodes are interleaved in such a way that a number of conductor pairs extending in parallel are formed.

Moreover, the first electrode may further comprise a second set of essentially parallel first electrode conductor lines, and the second electrode may further comprise a second set of essentially parallel second electrode conductor lines, the first and second electrodes being arranged such that at least one conductor pair including neighboring first and second electrode conductor lines is formed.

By providing an additional set of mutually essentially parallel conductor lines, simultaneous beam-shaping in more than one direction can be provided in an advantageous manner.

To this end, the second sets of conductor lines may be arranged at an angle with respect to the first sets of conductor lines.

Since the refractive index experienced by a light beam passing through an LC layer is generally polarization dependent, typically only one polarization component of a ray of unpolarized light passing through the beam-shaping device is bent. By configuring the first and second electrodes in such a way that the LC molecules are reoriented in different planes of reorientation in different portions of the beam-shaping device, bending of different polarization components of incident rays of unpolarized light can be achieved in those different portions of the beam-shaping device.

Additionally, the provision of different sets of conductor lines being provided with an angle with respect to each other enables shaping of the beam to a geometry determined by the number of such sets and their orientations in a plane parallel to the LC layer.

Moreover, the different conductor lines may vary in width, and further electrodes may be provided on the side of the LC-layer facing the first substrate, in addition to the above-mentioned first and second electrodes.

Furthermore, the beam shaping device may comprise a third electrode having at least one third electrode conductor line, and a fourth electrode having at least one fourth electrode conductor line, arranged on an opposite side of the liquid crystal layer with respect to the first and second electrodes.

Through the provision of such additional electrodes, the LC molecules can be reoriented in more complex reorientation patterns, whereby essentially polarization independent and/or symmetric beam-shaping can be achieved.

According to one embodiment, the third and fourth electrodes may be arranged such that each of the third and fourth electrode conductor lines is essentially perpendicular with a corresponding one of said first and second electrode conductor lines.

According to one embodiment, the liquid crystal layer may be homeotropically aligned when not subjected to an electric field.

When a liquid crystal layer is homeotropically aligned, the liquid crystal molecules are arranged perpendicularly to the liquid crystal layer, so that molecule ends are facing the substrates between which the liquid crystal layer is sandwiched.

Using this kind of alignment, the liquid crystal molecules can be controlled to be reoriented in any direction without any anomalies. According to an alternative embodiment, the liquid crystal (LC) molecules comprised in the liquid crystal layer may, in the absence of an electric field acting on the molecules, be aligned in such a way that the long axis of each LC-molecule is essentially parallel to the nearest substrate. Furthermore, in order to prevent the occurrence of an unwanted twist upon application of a voltage across the electrodes, the LC-molecules may be oriented in the plane parallel to the nearest substrate such that the long axis of each LC-molecule is substantially perpendicular to an adjacent conductor line pair.

In this case when an electric field is applied, the LC-molecules are tilted and no twist thereof takes place. Through this state of initial orientation, all the light in a beam of a linearly polarized light can be controlled upon application of an electric field. This is not the case when a twist is introduced.

This kind of planar alignment may, for example, be achieved through so-called rubbing techniques or by photo-alignment. In case of multiple regions having various electrode patterns or curved electrodes, these regions should typically be treated individually during manufacturing to bring about the desired planar alignment.

Furthermore, first and second beam-shaping devices according to the present invention may advantageously be arranged in a stacked structure to form a beam-shaping arrangement.

In this manner, the beam shaping characteristics of the constituent beam shaping devices can be utilized to provide improved beam shaping.

The first and second beam shaping devices in such a beam-shaping arrangement may be oriented in relation to each other such that at least a portion of first and second electrodes comprised in the first beam shaping device are perpendicular to a corresponding portion of first and second electrodes comprised in the second beam shaping device.

Hereby, an essentially symmetrical beam divergence can be achieved, utilizing both polarization directions of the incident light beam to be shaped.

Furthermore, the beam-shaping arrangement may comprise a further optical member adapted to alter a polarization state of a light beam passing through the beam-shaping arrangement.

Such a further optical member may, for example, be a rotator for altering the polarization state of the light after passage of the first beam-shaping device, and before passage of the second beam-shaping device. Hereby, polarization independent beam-shaping can be achieved although the LC layer acts on the light beam in a polarization dependent manner. The rotator may, for example, be provided in the form of a so-called retardation plate or a liquid crystal material, such as a liquid crystal polymer. For rotating linearly polarized light by 90°, a so-called half-wave-plate or a LC-material in a twisted nematic configuration may be used.

The beam-shaping device according to the present invention may, furthermore, advantageously be comprised in a lighting device further comprising a light-source, such as a light-emitting diode or a semiconductor laser, arranged in such a way that a light beam emitted by the light-source passes through the beam shaping device.

In particular, such a lighting device may advantageously include the above-discussed beam-shaping arrangement.

The beam shaping device may further comprise a layer between the electrodes and the liquid crystal layer. This can be used to change the beam shaping (i.e. lens) characteristics, for example the lens power for a given thickness of structure. If the distance between the neighboring portions of the electrode wires is p, the thickness of the layer is $d_{solid}$, the permittivity of a substrate in contact with the liquid crystal layer is $\varepsilon_{sub}$, and the component of the permittivity of the liquid crystal material parallel to the extraordinary axis is $\varepsilon_{LC}$, then the design can be such that $0.7<a1<12$, in which $a1=\varepsilon\varepsilon_{LC}\times d_{solid}/p$. This defines the desired thickness of the layer in relation to the wire pitch and permittivity of the liquid crystal material. The design can also be such that $0.9<a2<3.6$, in which $a2=\varepsilon_{LC}/\varepsilon_{sub}$.

A conductor layer, with or without a second insulator layer, can be provided on the opposite side of the liquid crystal layer to the electrodes. This can be used to shape the electric field in the beam shaping device. The conductor layer can have any shape desired. It may for example be a non-patterned layer extending over an entire lens forming portion of the LC layer.

If present, the second insulator layer can have a thickness $d_{ground}$, wherein $0.9<b1<14.4$ and $0:4<b2<6.4$, in which $b1=\varepsilon_{LC}\times d_{solid}/p$ and $b2=\varepsilon_{LC}\times d_{ground}/p$. This defines the thickness of the layer between the electrodes and the liquid crystal layer, and the thickness of the insulator layer on the opposite side, in relation to the wire pitch and permittivity of the liquid crystal material.

A control means can apply a variable voltage to the conductor layer. For example it can apply a first ac voltage to the first electrode and apply a second ac voltage to the second electrode, with the first and second ac voltages in antiphase with the same frequency, and with the variable voltage having a different phase or higher frequency. The conductor layer is thus used to alter the electric field in the LC layer, and this can be used to tune the beam shaping optical performance (rather than having only on or off control).

Alternatively, a dc voltage can be applied to the conductor layer, and the first and second ac voltages can then each comprise first and second superposed components, the first components of the first and second voltages being in anti-phase with the same frequency, and the second components being the same and having a different phase or higher frequency.

An opaque layer can be provided in the region of the electrodes and aligned with a region of lowest beam shaping effect. The advantage is that lens aberrations, occurring at and in the vicinity of the first and second electrodes when the device is driven in the lensing mode can be shielded. This provides an improved light beam. This opaque layer may be in the form of an opaque material that is opaque permanently. Alternatively, the opaque layer may have a switchable opaqueness, i.e. the opaque layer may become actually opaque upon driving the device in the lensing mode of the device, while it is not opaque when the device is not driven in the lensing mode. In this case light throughput is optimum in the non-lensing mode.

A device having such a switchable opaque layer may comprise an analyzer on the opposite side of the liquid crystal layer to the first and second electrodes, the analyzer being configured such that in the lensing mode of the device, light traveling through the device at the position of electrodes is blocked at least partially by the analyzer, while light traveling through the device at a lensing location, substantially away from the electrodes, is not blocked by the analyzer. Thus, for example, within a device, near and above a first or second electrode the LC directors will be aligned predominantly perpendicularly to the device or substrate layers when the device is operated in the lensing mode. Hence, when polarized light, such as for example linearly polarized light, travels through the device in the lensing mode, the polarization will not be changed at these locations. At the same time, at locations in the LC layer farther from the electrodes and where lens action is provided by the electrode field lines, the directors of the LC material will be aligned substantially more parallel to the substrates. Consequently, the light traveling through the device may be altered with respect to its polarization such that it is able to pass the analyzer. Preferably, the setup of LC alignment and analyzer orientation is such that in the non-lensing mode all light is allowed to pass the device including analyzer.

Some of these modifications are of particular interest for autostereoscopic display devices, in which there is a fixed desired focal length and fixed desired electrode wire spacing, to create the desired lens dimensions.

Thus, the invention also provides a switchable autostereoscopic display device comprising:

a display panel having an array of display pixel elements for producing a display, the display pixel elements being arranged in rows and columns; and an imaging arrangement which directs the output from different pixel elements to different spatial positions to enable a stereoscopic image to be viewed, arranged such that display pixel outputs for both eyes of a viewer are simultaneously directed, wherein the imaging arrangement is electrically switchable between a 2D mode and a 3D mode and comprises a beam shaping device of the invention.

The display panel may comprise an array of individually addressable emissive, transmissive, refractive or diffractive display pixels. The display panel preferably is a liquid crystal display panel or a light emitting diode panel.

The invention also provides a method of controlling a beam shaping device, the beam shaping device comprising first and second optically transparent substrates, a liquid crystal layer sandwiched there between, and first and second electrodes arranged on a side of said liquid crystal layer facing said first substrate, wherein the method comprises:

controlling the beam shaping device between beam-shaping states, each permitting passage of light through said beam-shaping device in a direction perpendicular thereto by applying a voltage across said first and second electrodes thereby to generate an electric field including a portion essentially parallel to said liquid crystal layer in a segment thereof between neighboring portions of said electrodes and extending substantially from said first substrate to said second substrate.

The beam shaping device may further comprise a conductor layer on the opposite side of the liquid crystal layer to the electrodes, and the method further comprises applying a first ac voltage to the first electrode and applying a second ac voltage to the second electrode. A variable voltage can be applied to the conductor layer, and wherein the first and second ac voltages are in antiphase with the same frequency, and the variable voltage has a different phase or higher frequency. Alternatively, a dc voltage can be applied to the conductor layer, and the first and second ac voltages each comprise first and second superposed components, the first components of the first and second voltages being in antiphase with the same frequency, and the second components being the same and having a different phase or higher frequency.

This method is of particular interest for controlling the lens function of a lens of an autostereoscopic display device.

BRIEF DESCRIPTION OF THE DRAWINGS

These and other aspects of the present invention will now be described in more detail, with reference to the appended drawings showing a currently preferred embodiment of the invention, wherein:

FIG. 23a-23c shows a 3D display according to the invention.

DETAILED DESCRIPTION

In the following description, the present invention is described with reference to a beam-shaping device having a homeotropically aligned liquid crystal layer—the liquid crystal (LC) molecules comprised in the LC layer are oriented perpendicular to the substrates when no voltage is applied to the electrodes. It should be noted that this by no means limits the scope of the present invention, which is equally applicable to beam-shaping devices in which the liquid crystal layer is aligned in any other way, such as a planar orientation in which the LC-molecules are oriented in a plane parallel with the substrates. In this orientation, the LC-molecules may be aligned in parallel with or perpendicular to the electrodes, or have a hybrid orientation where the LC molecules have a first orientation adjacent to the first substrate and a second orientation, orthogonal to the first orientation, adjacent to the second substrate.

Furthermore, in order not to obscure the present invention by details not directly related thereto, further layers well known to a person skilled in the art, such as alignment layers for aligning the LC-molecules etc have neither been depicted in the accompanying drawings, nor described in detail herein.

It should be noted that the drawings are not to scale. To, however, give an idea of suitable dimensions, it can be said that the width of a conductor line in the electrodes would typically range from 1 μm to 20 μm. Furthermore, the conductor lines are typically spaced apart by 10 μm to 100 μm, and the thickness of the LC layer is generally between 5 μm and 50 μm.

In one aspect, the invention relates generally to beam-shaping devices suitable for many different applications, and in another aspect, the invention relates more specifically to additional features which make the use of the beam shaping device of particular interest for a 2D/3D switchable display device. The general concepts and design of the beam-shaping device will first be described, followed by an explanation of the additional features particularly relevant to the 2D/3D display field (although these additional features also have more general application).

Figure 1A:
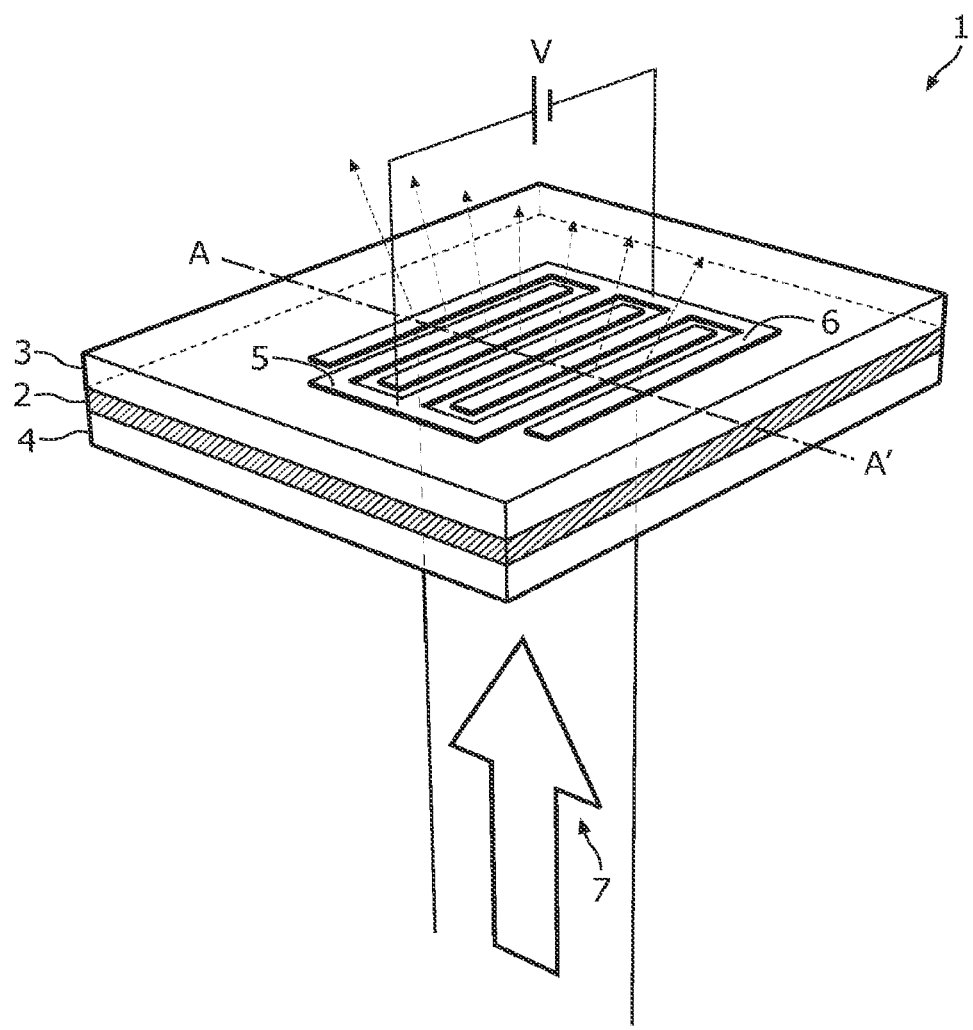
FIG. 1a is a perspective view of an exemplary beam-shaping device according to an embodiment of the present invention.
Figure 1B:
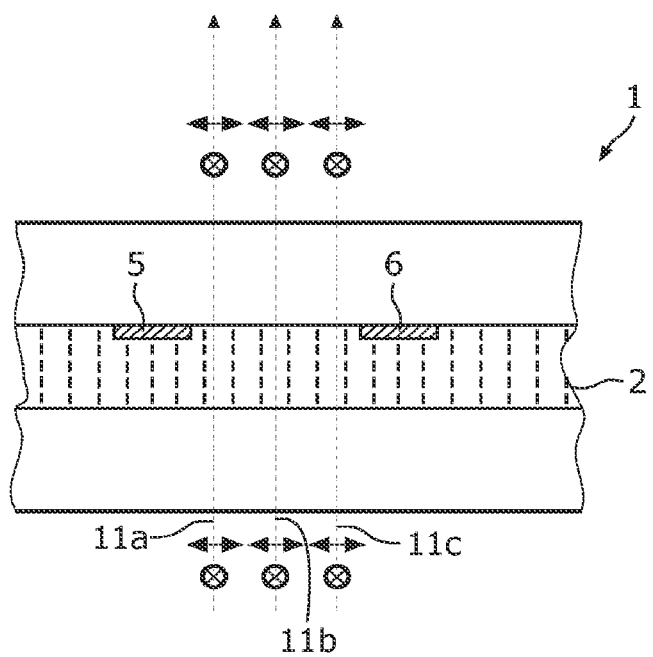
FIG. 1b is a cross-section view of the beam-shaping device in FIG. 1a along the line A-A' when no voltage is applied across the electrodes.
Figure 1C:
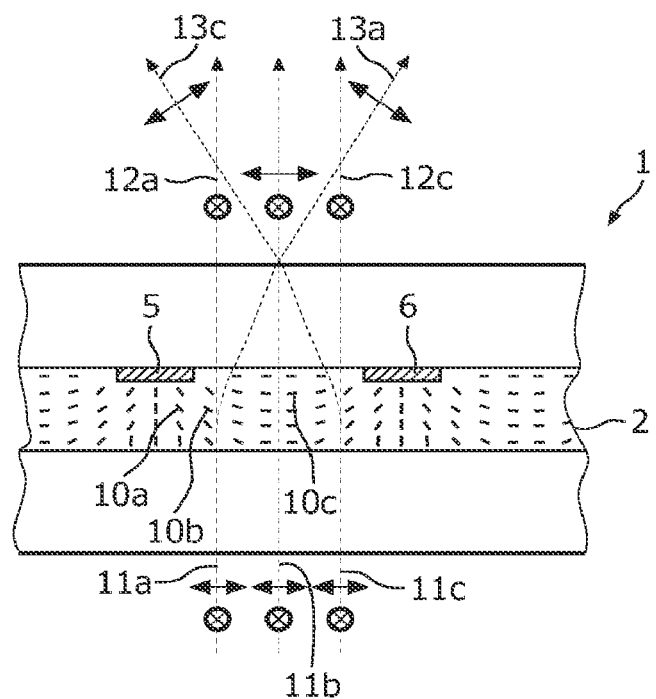
FIG. 1c is a cross-section view of the beam-shaping device in FIG. 1a along the line A-A' when a voltage V is applied across the electrodes.

FIGS. 1a-1c schematically illustrate an exemplary beam-shaping device according to an embodiment of the present invention.

In FIG. 1a, a beam-shaping device 1 is shown, comprising a homeotropically aligned liquid crystal (LC) layer 2 sandwiched between first 3 and second 4 transparent substrates. On the first substrate 3, facing the LC layer 2, first 5 and second 6 comb-shaped transparent electrodes are provided. By applying a voltage V over these electrodes 5, 6, a collimated light beam 7 incident on the beam-shaping device can be diverged as is schematically illustrated in FIG. 1a.

FIG. 1b, which is a cross-section view along the line A-A' in FIG. 1a, schematically shows the situation where no voltage is applied across the electrodes 5, 6. Since no voltage is applied, no electric field is formed, and, consequently, the LC-molecules have the orientation imposed on them by the alignment layers (not shown). In the case illustrated in FIG. 1b, the LC-molecules are homeotropically aligned, and the shape of the incident collimated light beam 7, here represented by three parallel rays 11a-c of light is unchanged by the passage through the beam-shaping device 1.

With reference to FIG. 1c which schematically shows the situation where the voltage V is applied across the electrodes 5, 6, the beam-shaping mechanism utilized by the beam-shaping device in FIG. 1a will now be described in more detail.

As is schematically shown in FIG. 1c, the liquid crystal (LC) molecules 10a-c comprised in the LC layer 2 are aligned to the electric field lines between the electrodes 5, 6. Due to this reorientation, regions of the LC layer 2 having different refractive indices are formed. In the exemplary case illustrated in FIG. 1c, the refractive index experienced by collimated light beam 7 hitting the beam-shaping device 1 in a direction which is (locally) perpendicular thereto varies between the ordinary refractive index $n_o$ resulting from LC molecules 10a oriented perpendicular to the LC layer 2 and the extraordinary refractive index $n_e$ resulting from LC molecules 10c oriented in parallel with the LC layer 2. Light hitting the beam-shaping device 1 between a portion thereof with "perpendicular" LC-molecules 10a and a portion thereof with "parallel" LC-molecules 10c will experience an intermediate refractive index.

In FIG. 1c, the three rays 12a, b, c representing the linear polarization component of unpolarized light having a direction of polarization which is perpendicular to the long axis of the LC molecules (ordinary rays) pass through the beam-shaping device 1 practically without experiencing a refractive index gradient. Thus neither of these rays 12a-c has its direction altered significantly during passage through the LC-layer 2.

The other polarization component, rays 13a, b, c, representing light polarized in the plane of the long axis of the molecules (extraordinary rays) on the other hand experience a refractive index gradient and are therefore refracted as is schematically indicated in FIG. 1c.

Consequently, a maximum of 50% of the light in collimated light beam 7, which is illustratively non-polarized light, is controllable by the beam-shaping device 1 in FIGS. 1a-1c.

In the following, three exemplary beam-shaping devices/arrangements enabling control of substantially all of the light in an unpolarized light beam will be described with reference to FIGS. 2-4.

An illustrative first beam-shaping arrangement 20 will be described with reference to FIG. 2, which is a cross-section view showing first 21 and second 22 beam-shaping devices as described in connection with FIGS. 1a-1c arranged in a stacked structure with a retardation plate 23 sandwiched there between.

Again, three rays 24a-c of unpolarized light will be followed through the illustrative first beam-shaping arrangement 20. As described in connection with FIG. 1b, the extraordinary rays will be influenced by the first beam-shaping device 21 and the ordinary rays will pass through this first beam-shaping device 21 without being influenced. As the ordinary ray go through the retardation plate 23, which is here provided in the form of a so-called half wave plate or a LC polymer in a twisted nematic configuration, the polarization direction is rotated 90°.

Hence, when entering the second beam-shaping device 22, the previously unaffected components 25a-c are now polarized in the same plane as the long axis of the LC-molecules 27 of the second beam-shaping device 22 and will be deflected in the same manner as the other polarization components 26a, c were when passing through the first beam-shaping device 21.

Figure 2:
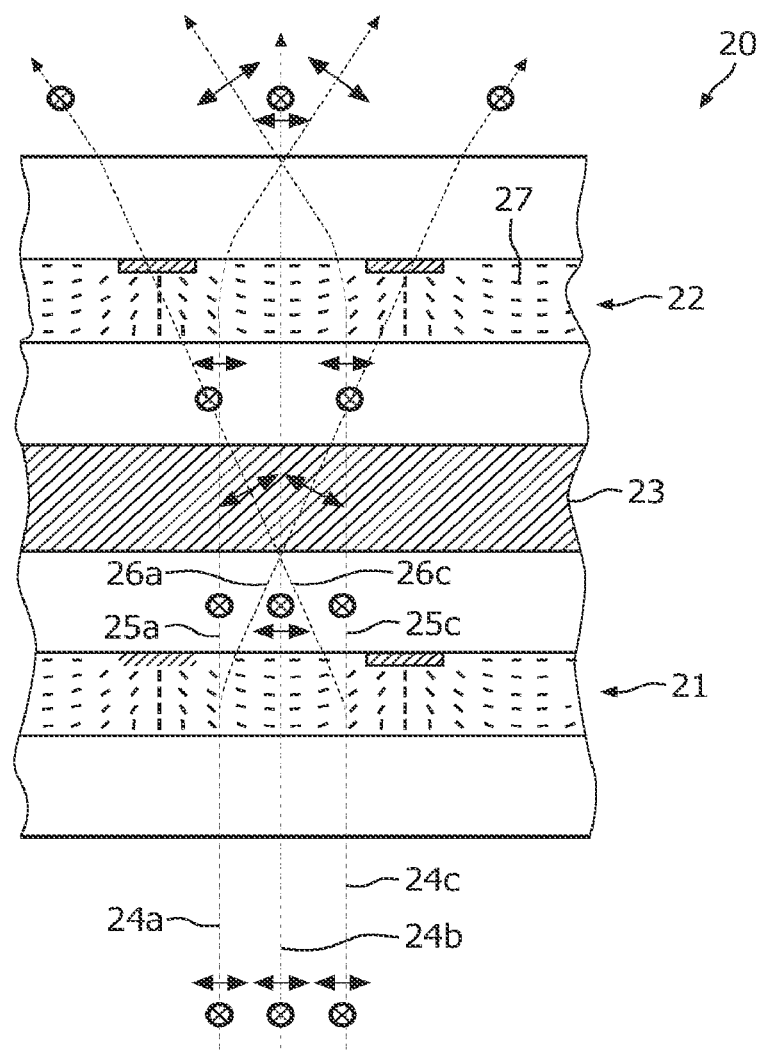
FIG. 2 is a cross-section view of a first beam-shaping arrangement wherein a retardation plate is sandwiched between two beam-shaping devices.

Hereby, as schematically illustrated in FIG. 2, all of the unpolarized light passing through the illustrative first beam-shaping arrangement 20 can be controlled by the illustrative first beam-shaping arrangement 20.

In the above examples, the behavior of LC molecules with a positive dielectric anisotropy is described. It should, however, be noted that it is also possible to use LC molecules with negative dielectric anisotropy. In that case the rays 24a-c will be refracted in an opposite direction compared to what is described above.

It should be noted that, in the presently illustrated examples, the refraction at interfaces between substrates and LC-layers etc has been disregarded in order to simplify the illustrations.

Figure 3:
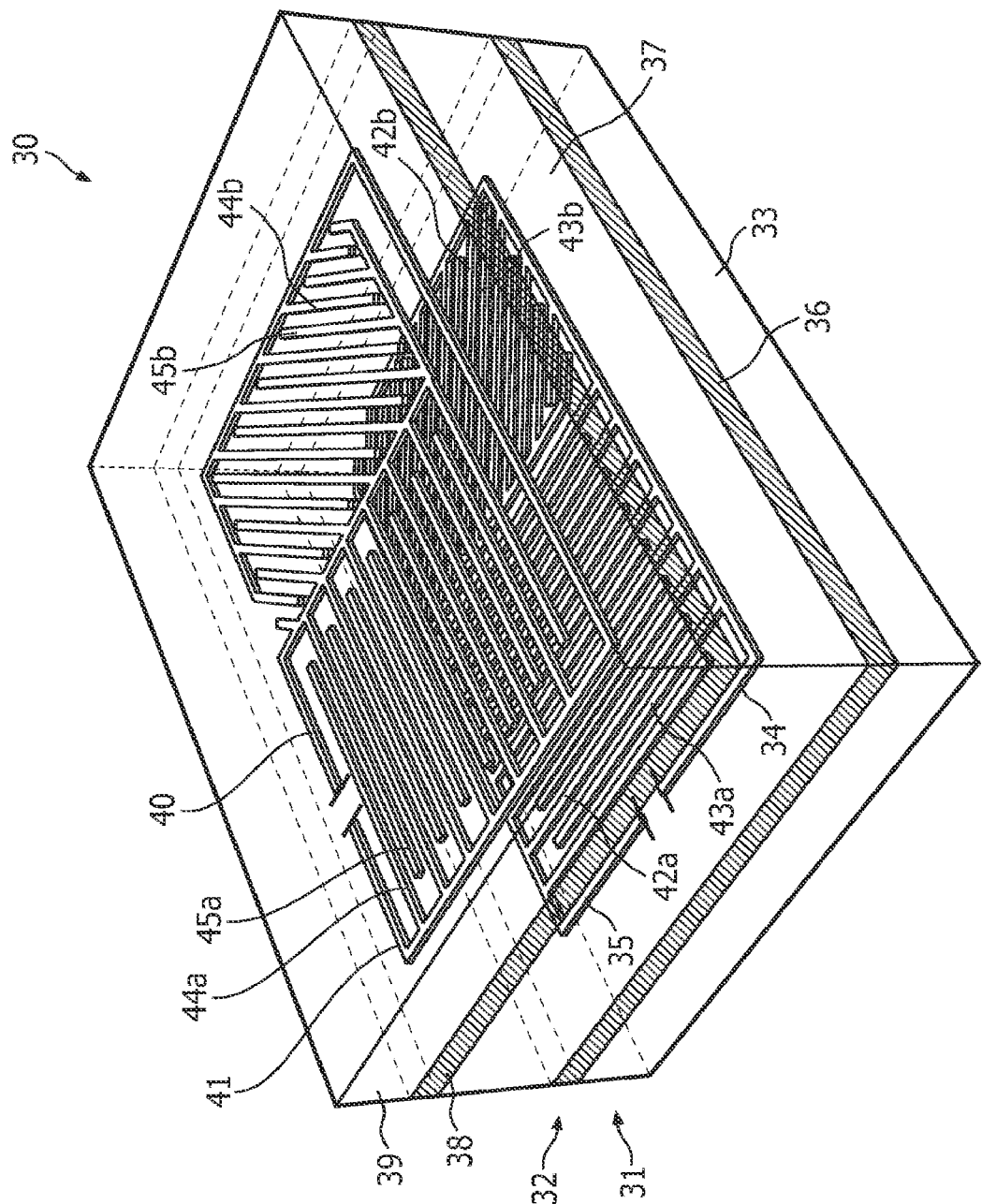
FIG. 3 is a perspective view of a second beam-shaping arrangement comprising two beam-shaping devices having complementary electrodes, arranged in a stacked structure.

With reference to FIG. 3, an illustrative second beam-shaping arrangement 30 will now be described.

In FIG. 3, first 31 and second 32 beam-shaping devices are shown in a stacked structure. In order from bottom to top of the stacked structure, the first beam-shaping device 31 has a first substrate 33, on which first 34 and second 35 electrodes are provided, an LC-layer 36, and a second substrate 37. In the presently illustrated embodiment, the second substrate 37 of the first beam-shaping device 31 is also the first substrate of the second beam-shaping device 32. Obviously, this second substrate 37, which is illustratively a common substrate, could alternatively be provided as two separate substrates. The second beam-shaping device 32 further has an LC layer 38, and a second substrate 39 provided with first 40 and second 41 electrodes.

As can be seen in FIG. 3, each of the electrodes 34, 35, 40, 41 of the illustrative second beam-shaping arrangement 30 has two sets 42a-b, 43a-b, 44a-b, and 45a-b, respectively of conductor lines. Within each of the two sets 42a-b, 43a-b, 44a-b, and 45a-b, the conductor lines are essentially parallel to each other, and the two sets 42a-b, 43a-b, 44a-b, and 45a-b are provided with an angle of about 45° with respect to each other.

Furthermore, the first and second beam-shaping devices 31, 32 are arranged in relation to each other in such way that the electrodes 34, 35 of the first beam-shaping device 31 are perpendicular to the electrodes 40, 41 of the second beam-shaping device 32.

Through this illustrative second beam-shaping arrangement 30, an incident collimated beam can be shaped symmetrically and utilizing both polarization components of the incident light.

Finally, with reference to FIG. 4, a third exemplary beam-shaping device/arrangement 50 will be described, which comprises an LC-layer 2 sandwiched between first 3 and second 4 optically transparent substrates. On each of the first and second substrates 3, 4, first 51, 52, and second 53, 54 comb-shaped electrodes are provided on the side 55, 56 of the first and second substrates 3, 4 facing the LC-layer 2.

Figure 4:
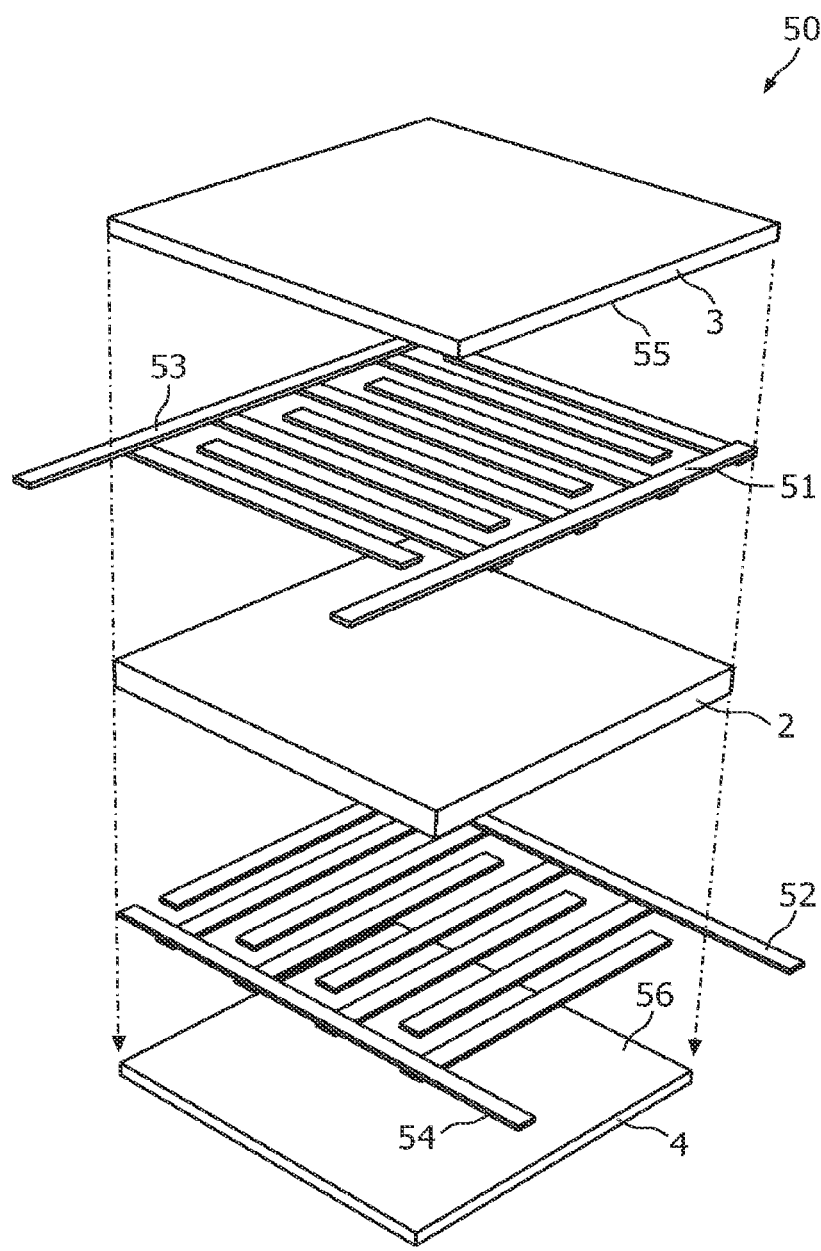
FIG. 4 is an exploded view schematically illustrating another exemplary beam-shaping device according to an embodiment of the present invention.

As illustrated in FIG. 4, the electrodes 51, 53 on the first substrate 3 are essentially perpendicular to the electrodes 52, 54 on the second substrate 4.

Through this configuration, three-dimensional re-orientation of the LC-molecules in the LC-layer can be achieved, which enables polarization-independent beam-shaping.

In addition to the electrode configurations illustrated in FIG. 1a and FIG. 3, many other electrode configurations are possible and may be advantageous depending on the particular application. A few examples of such additional electrode configurations are schematically illustrated in FIGS. 5a-5b.

Figure 5A:
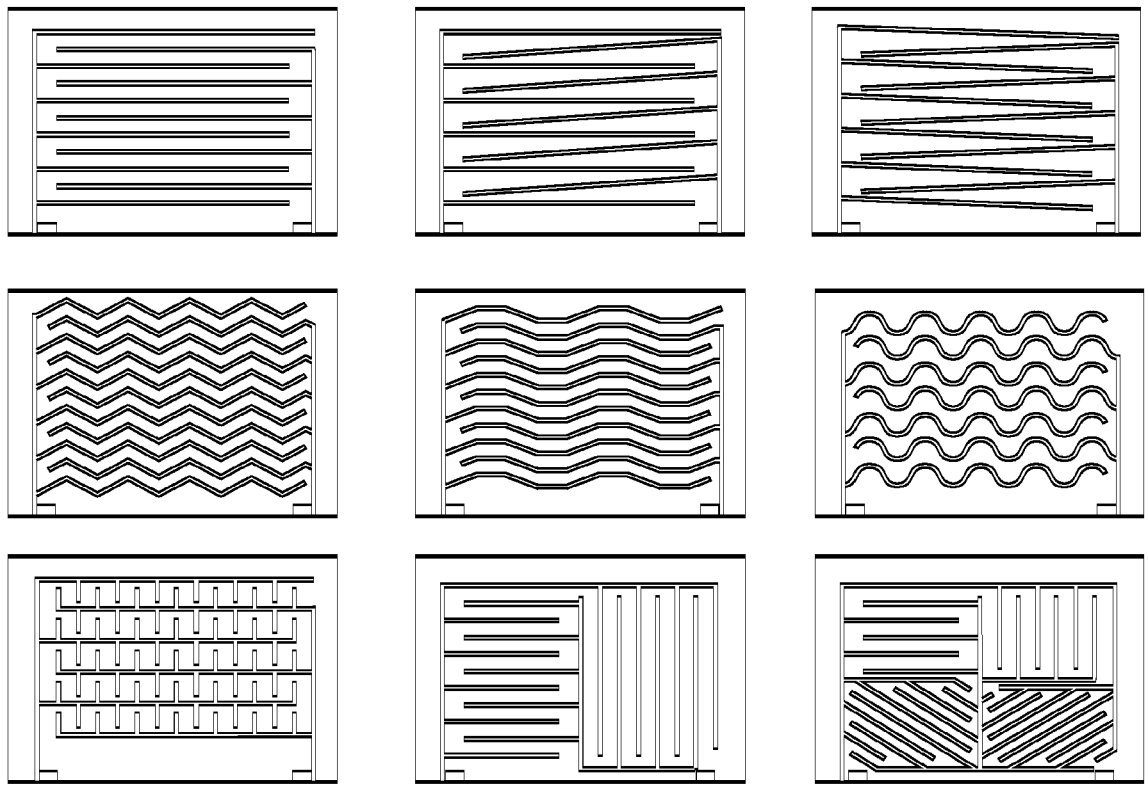
FIGS. 5a-5b show various exemplary electrode configurations.

In FIG. 5a, various in-plane configurations with two electrodes are illustrated, where the conductor lines have different directions in relation to each other, are non-straight, etc.

Figure 5B:
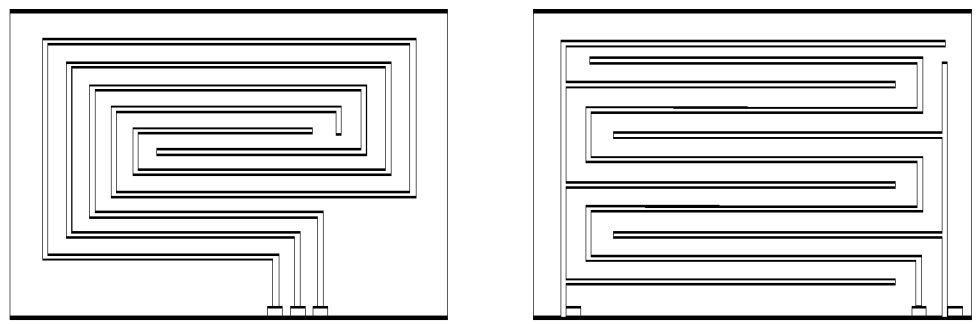

In FIG. 5b, two examples of configurations with three in-plane electrodes are schematically shown.

It should be noted that the variations illustrated in FIGS. 5a-5b represent examples only and that many other variations are apparent to one skilled in the relevant art.

The person skilled in the art realizes that the present invention by no means is limited to the preferred embodiments. For example, the electric field applied across the electrodes may advantageously be obtained through the application of an alternating voltage having a frequency above 100 Hz in order to overcome charging effects. It is also possible to use a pixilated cell in combination with active matrix addressing.

Experiments

With reference to FIGS. 6a-6d, which are diagram illustrating how the beam divergence in an experimental setup of a beam-shaping device according to an embodiment of the present invention varies with respect to various parameters, a brief description of some of the experiments carried out will now be provided.

In all of the Figures, the intensity has been normalized in order to illustrate the angular distribution. Furthermore, in the curves showing beams that are only slightly diverged have been clipped to improve the discernability of the more diverged beams.

Beam Divergence as a Function of Applied Voltage

Figure 6A:
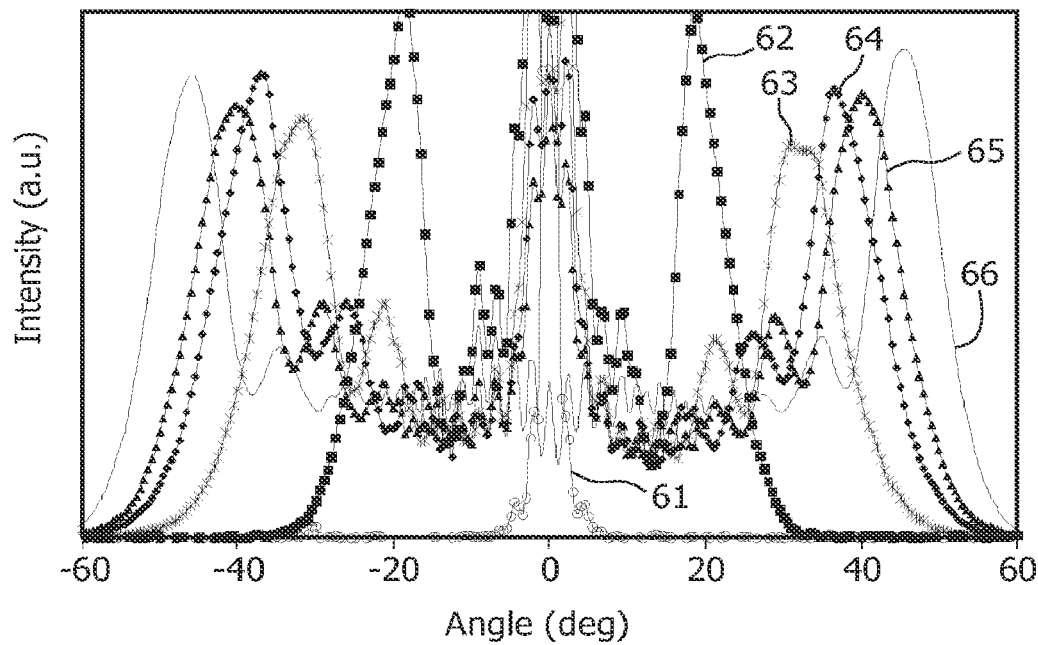
FIGS. 6a-6d are diagrams illustrating experiments performed on a beam-shaping device according to an embodiment of the present invention.

In FIG. 6a, the angular distribution of light following passage through the beam-shaping device of a collimated beam of polarized light is shown with respect to the voltage applied to the electrodes.

The characteristics of the cell used in the experiment resulting in the graphs in FIG. 6a are as follows:

Electrode width: 4 µm

Free Distance between electrodes: 10 □m

Cell gap: 18 µm

Liquid crystal material: BL009

Alignment layer polyimide: Nissan 1211, homeotropically aligned (no rubbing)

Using this cell configuration, the alternating voltage applied across the electrodes has been varied between 0 Vrms and 50 Vrms.

When applying 0 Vrms across the electrodes, no divergence of the beam is achieved, as illustrated by the curve 61 in FIG. 6a. When gradually increasing the voltage, the beam is more and more diverged. When applying 5 Vrms the light is diverged as illustrated by the curve 62. The curve 63 results from applying 10 Vrms, the curve 64 results from applying 15 Vrms, and the curves 65 and 66 correspond to a voltage of 20 Vrms and 50 Vrms, respectively.

Beam Divergence as a Function of Free Distance Between Electrodes

Figure 6B:
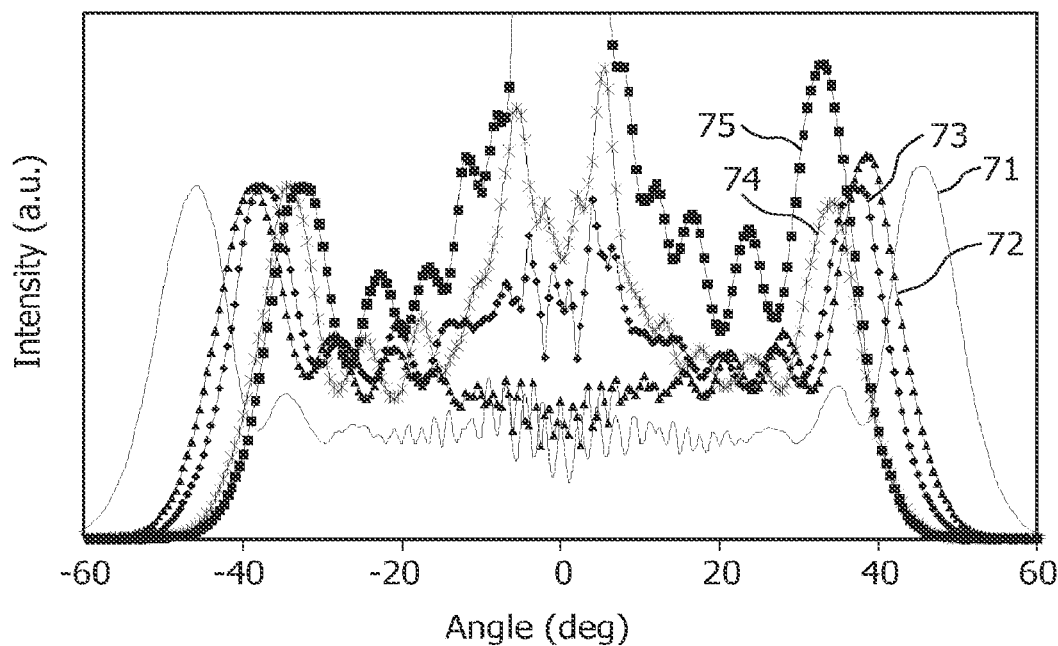

In FIG. 6b, the angular distribution of light following passage through the beam-shaping device of a collimated beam of polarized light is shown with respect to the distance between the electrodes.

The characteristics of the cell used in the experiment resulting in the graphs in FIG. 6b are as follows:
 Electrode width: 4 μm
 Cell gap: 18 μm
 Liquid crystal material: BL009
 Alignment layer polyimide: Nissan 1211, homeotropically aligned (no rubbing)
 Applied voltage: 50 Vrms Using this cell configuration, the free distance between the electrodes has been varied between 10 μm and 30 μm.

For a given voltage applied across the electrodes, a shorter distance between the electrodes entails a higher electric field. A higher electric field leads to a more efficient redirection of the liquid crystal molecules in the liquid crystal layer, and hence to a more efficient beam shaping.

The shortest distance, 10 μm, leads to the largest divergence, as can be seen in FIG. 6b, where this distance corresponds to the curve 71. When the distance is increased to 15 μm, the beam divergence is also decreased to have the angular distribution represented by the curve 72 in FIG. 6b. With a further increase to 20 μm, the curve 73 is obtained, and the two final curves 74, 75 in FIG. 6b result from distances between the electrodes of 25 μm and 30 μm, respectively.

Beam Divergence as a Function of Electrode Width

Figure 6C:
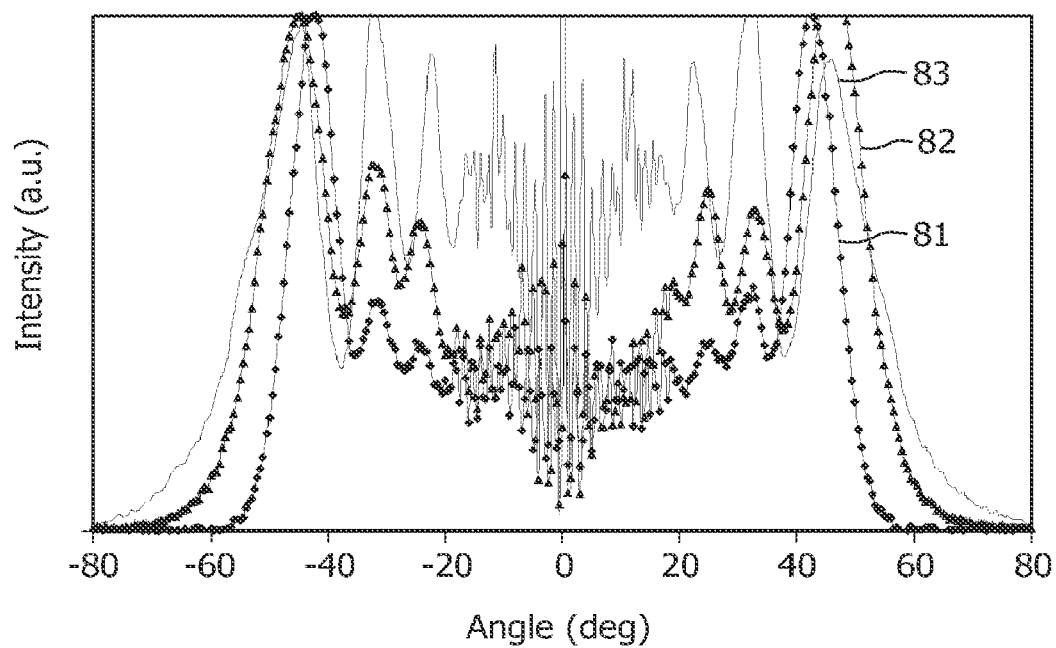

In FIG. 6c, the angular distribution of light following passage through the beam-shaping device of a collimated beam of polarized light is shown with respect to the electrode width.

The characteristics of the cell used in the experiment resulting in the graphs in FIG. 6c are as follows:
 Free distance between electrodes: 12 μm
 Cell gap: 18 μm
 Liquid crystal material: BL009
 Alignment layer polyimide: Nissan 1211, homeotropically aligned (no rubbing)
 Applied voltage: 50 Vrms Using this cell configuration, the electrode width has been varied between 4 μm and 8 μm.

In FIG. 6c, the curve 81 corresponds to an electrode width of 4 μm, the curve 82 corresponds to an electrode width of 6 μm, and the curve 83 corresponds to an electrode width of 8 μm.

Beam Divergence as a Function of Cell Gap

Figure 6D:
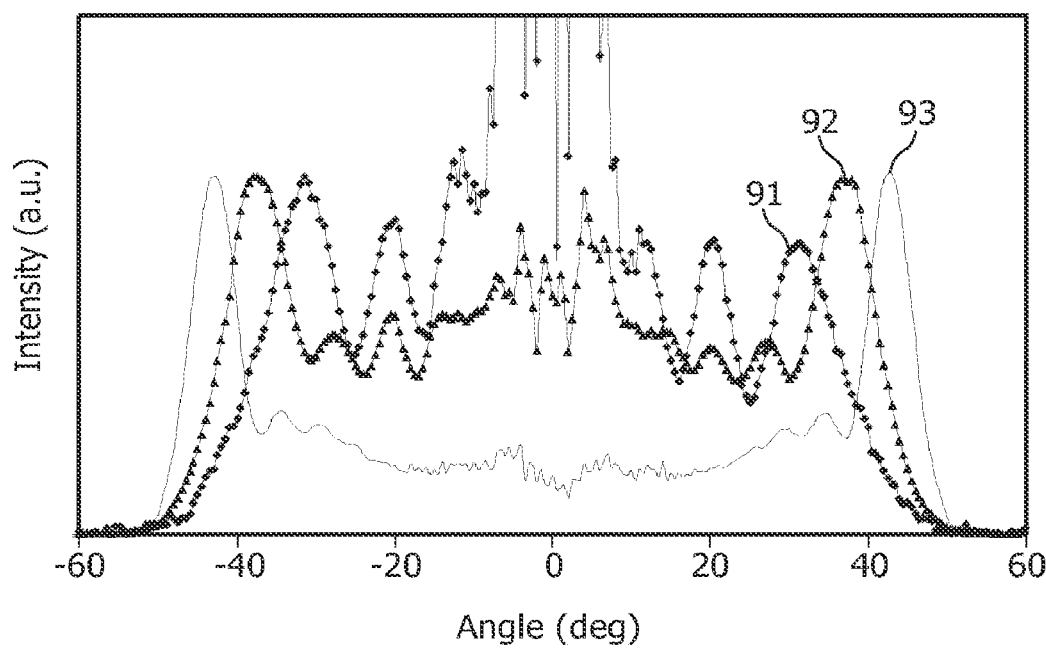

In FIG. 6d, the angular distribution of light following passage through the beam-shaping device of a collimated beam of polarized light is shown with respect to the cell gap.

The characteristics of the cell used in the experiment resulting in the graphs in FIG. 6d are as follows:
 Electrode width: 4 μm
 Free distance between electrodes: 20 μm
 Liquid crystal material: BL009
 Alignment layer polyimide: Nissan 1211, homeotropically aligned (no rubbing)
 Applied voltage: 50 Vrms Using this cell configuration, the cell gap has been varied between 12 μm and 27 μm.

Having a larger cell gap, each ray of the beam to be shaped travels a longer distance through the liquid crystal layer, and can thus be deflected to a larger degree.

The smallest cell gap, 12 μm, leads to the smallest divergence, as can be seen in FIG. 6d, where this cell gap corresponds to the curve 91. When the cell gap is increased to 18 μm, the beam divergence is also increased to have the angular distribution represented by the curve 92 in FIG. 6d. With a further increase of the cell gap to 27 μm, the curve 93 is obtained.

As mentioned above, beam shaping devices designed in accordance with the principles of the invention can have particular application in the field of 2D/3D switchable displays.

Figure 7:
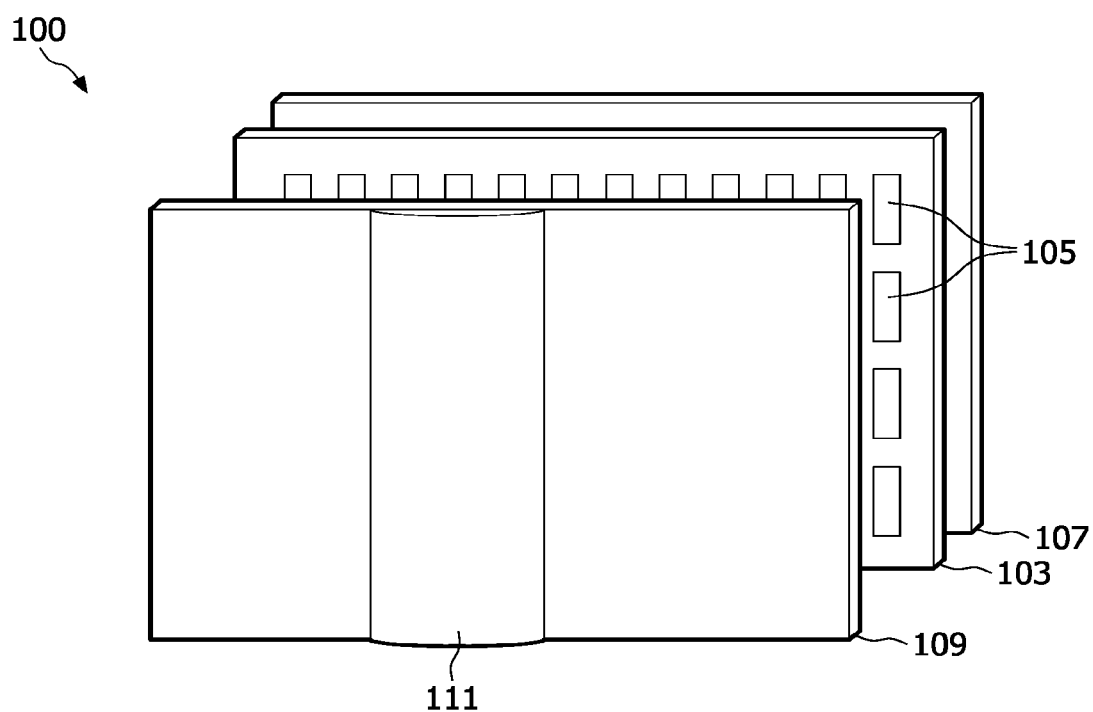
FIG. 7 shows a known autostereoscopic display device.

FIG. 7 is a schematic perspective view of a known direct view autostereoscopic display device 100. The known display device 100 comprises a liquid crystal (lc) display panel 103 of the active matrix type that acts as a spatial light modulator to produce the display.

The lc display panel 103 has an orthogonal array of display pixels 105 arranged in rows and columns. For the sake of clarity, only a small number of display pixels 105 are shown in the figure. In practice, the lc display panel 103 might comprise about one thousand rows and several thousand columns of display pixels 105.

The structure of the lc display panel 103 is entirely conventional. In particular, the lc display panel 103 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 105 can comprise opposing electrodes on the substrates, with the intervening liquid crystal material there between. The shape and layout of the display pixels 105 are determined by the shape and layout of the electrodes. The display pixels 105 are regularly spaced from one another by gaps.

Each display pixel 105 is associated with a switching element, such as a thin film transistor (TFT) or thin film diode (TFD). The display pixels are operated to produce the display by providing addressing signals to the switching elements, and suitable addressing schemes will be known to those skilled in the art.

The lc display panel 103 is illuminated by a light source 107 comprising, in this case, a planar backlight extending over the area of the display pixel array. Light from the light source 107 is directed through the lc display panel 103, with the individual display pixels 105 being driven to modulate the light and produce the display.

The known display device 100 also comprises a lenticular sheet 109, arranged over the display side of the lc display panel 103, which performs a view forming function. The lenticular sheet 109 comprises a row of lenticular elements 111 extending parallel to one another, of which only one is shown with exaggerated dimensions for the sake of clarity.

The lenticular elements 111 are in the form of convex cylindrical lenses, and they act as a light output directing means to provide different images, or views, from the lc display panel 103 to the eyes of a user positioned in front of the known display device 100.

The known display device 100 shown in FIG. 1 is capable of providing several different perspective views in different directions. In particular, each lenticular element 111 overlies a small group of display pixels 105 in each row. The lenticular element 111 projects each display pixel 105 of a group in a different direction, so as to form the several different views. As the user's head moves from left to right, his/her eyes will receive different ones of the several views, in turn.

It has been proposed to provide electrically switchable lens elements, as mentioned above. This enables the display to be switched between 2D and 3D modes.

Figure 8:
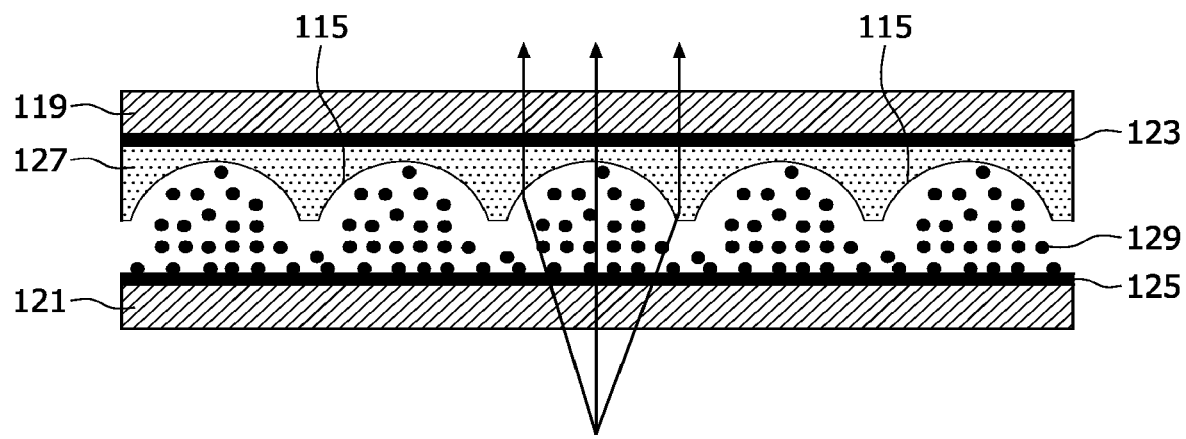
FIGS. 8 and 9 are used to illustrate how a known switchable autostereoscopic display device can function.
Figure 9:
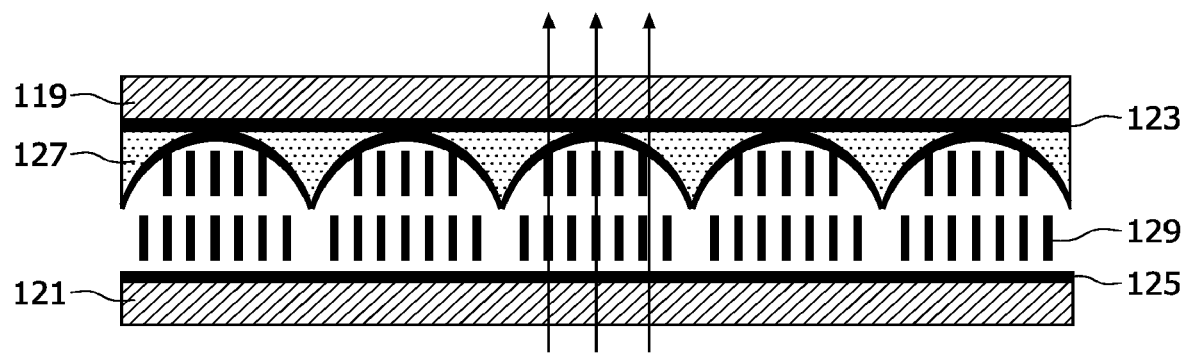

FIGS. 8 and 9 schematically show an array of electrically switchable lenticular elements 115 which can be employed in the device shown in FIG. 1. The array comprises a pair of transparent glass substrates 119, 121, with transparent electrodes 123, 125 formed of indium tin oxide (ITO) provided on their facing surfaces. An inverse lens structure 127, formed using a replication technique, is provided between the transparent glass substrates 119, 121, adjacent to an upper one of the transparent glass substrates 119. Liquid crystal material 129 is also provided between the transparent glass substrates 119, 121, adjacent to the lower one of the transparent glass substrates 121.

The inverse lens structure 127 causes the liquid crystal material 129 to assume parallel, elongate lenticular shapes, between the inverse lens structure 127 and the lower transparent glass substrate 121, as shown in cross-section in FIGS. 2 and 3. Surfaces of the inverse lens structure 127 and the lower transparent glass substrate 121 that are in contact with the liquid crystal material are also provided with an orientation layer (not shown) for orientating the liquid crystal material.

FIG. 8 shows the array when no electric potential is applied to the transparent electrodes 123, 125. In this state, the refractive index of the liquid crystal material 129 for light of a particular polarization is substantially higher than that of the inverse lens structure 127, and the lenticular shapes therefore provide a light output directing function, i.e. a lens action, as illustrated.

FIG. 9 shows the array when an alternating electric potential of approximately 50 to 100 volts is applied to the transparent electrodes 123, 125. In this state, the refractive index of the liquid crystal material 49 for light of the particular polarization is substantially the same as that of the inverse lens structure 127, so that the light output directing function of the lenticular shapes is cancelled, as illustrated. Thus, in this state, the array effectively acts in a "pass through" mode.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the imaging arrangement of the device.

Further details of the structure and operation of arrays of switchable lenticular elements suitable for use in the display device shown in FIG. 7 can be found in U.S. Pat. No. 6,069,650.

Figure 10:
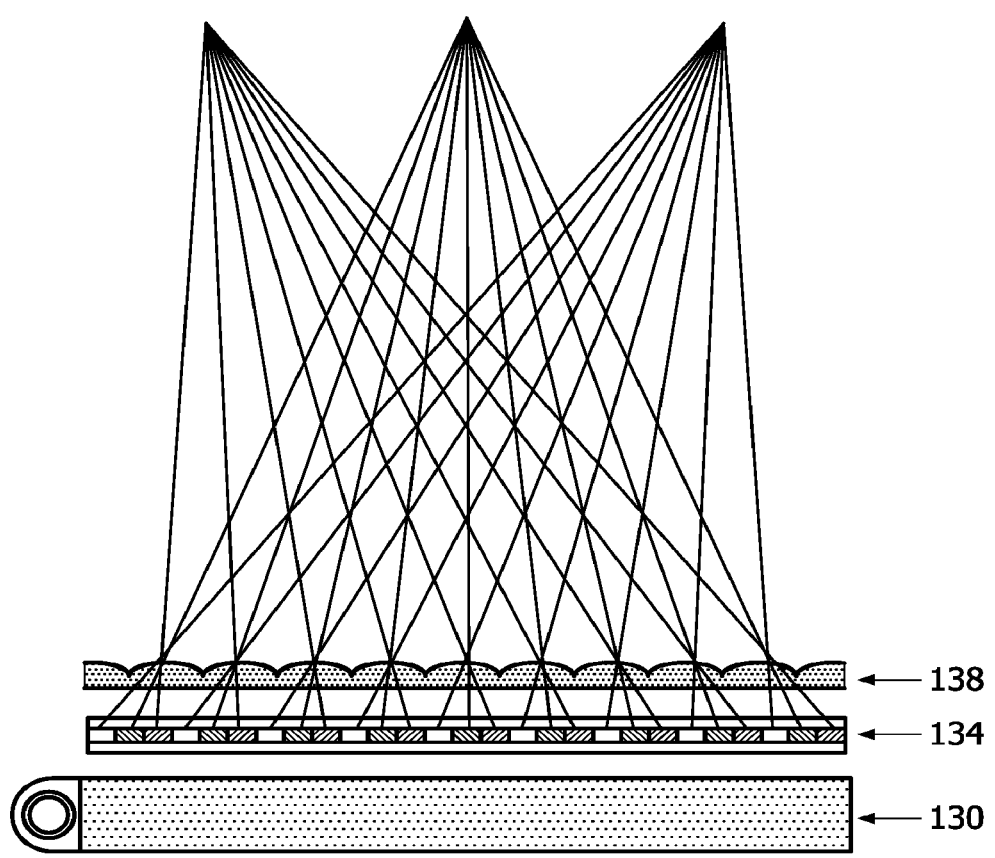
FIG. 10 shows the required lens function for an autostereoscopic display device.

FIG. 10 shows the principle of operation of a lenticular type imaging arrangement as described above and shows the backlight 130, display device 134 such as an LCD and the lenticular array 138.

The manufacture of the device shown in FIGS. 8 and 9 uses replica lenticulars, which requires equipment that is not standard in production facilities. The use of a beam shaping device as described above, having laterally controlled graded index lens function, thus simplifies the manufacturing process.

FIG. 1c shows the electric field distribution in the LC layer resulting from the use of interleaved wires as shown in FIG. 1a. The applied voltage is an alternating current, to counteract charging effects. The applied voltage is selected to be high enough to align the LC in the direction of the field. For a straightforward design there is an optimal ratio between LC layer thickness and width between electrodes (approximately 1:1.5) for the best lens action. However, the required width of the lens, in order to cover a certain amount of pixels for the desired number of views, and the desired thickness of the LC layer (to obtain the desired focal depth) often, but not always, hampers or even excludes this basic design from being used. A thicker layer of LC results in a lens with a shorter focal length. The main issue is that the LC layer has to be chosen to be thinner relative to the electrode pitch than would be optimal for the lens characteristics.

Figure 11A:
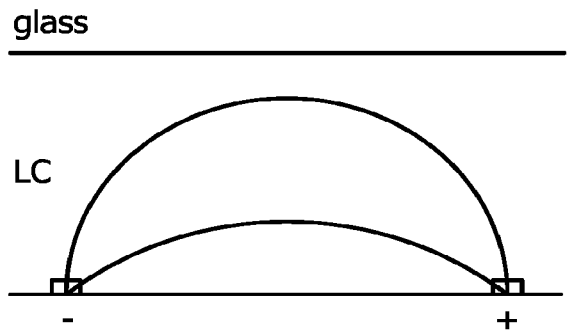
FIGS. 11a-11b are used to explain a problem in selecting dimensions for the lens elements of an autostereoscopic display device.
Figure 11B:
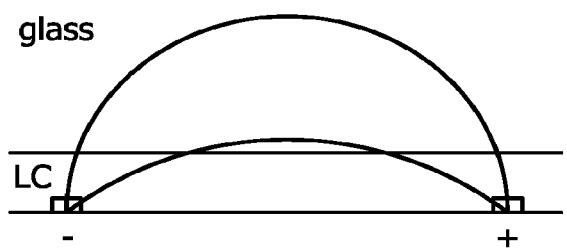

FIG. 11a shows schematically the desired ratio between thickness and electrode spacing, and FIG. 11b shows the electric field distribution in the structure when the preferred LC layer thickness is used to provide the desired focal distance in combination with a typical desired electrode spacing. These values of thickness and electrode spacing give rise to strong aberrations in the lens-action. By reducing the thickness of the LC layer in FIG. 11b to obtain the desired focal length, an optically inhomogeneous material is replaced with an optically homogeneous material, giving rise to the lens aberration.

Figure 12A:
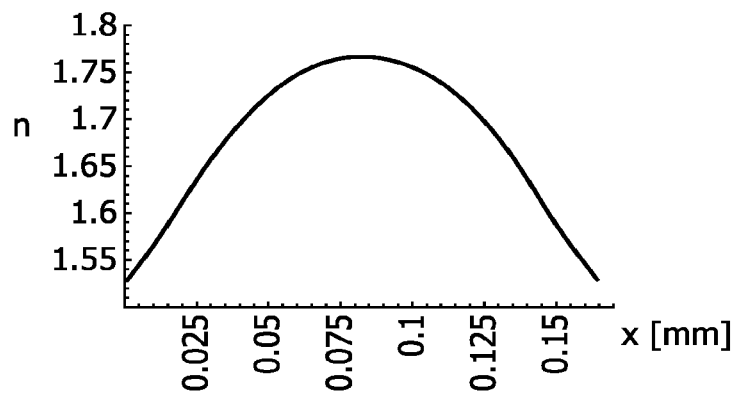
FIGS. 12a-12b and 13a-13b show the lens properties for the two lens configurations of FIG. 11.
Figure 12B:
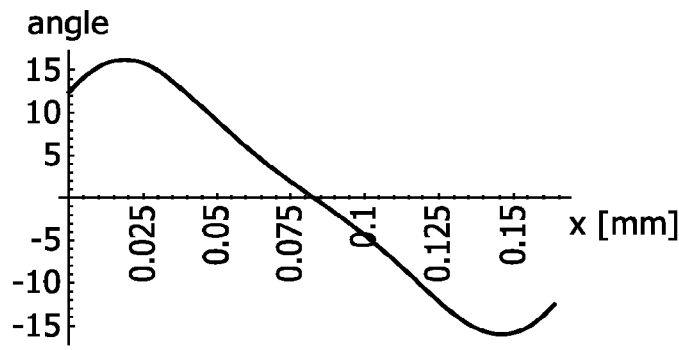

FIGS. 12a-12b show the lens characteristics (FIG. 12a shows the refractive index n versus distance x, and FIG. 12b shows the refractive index gradient ("angle") versus distance x) for the desired ratio of FIG. 11a. The thickness is 100 μm and the electrode spacing is 166 μm.

Figure 13A:
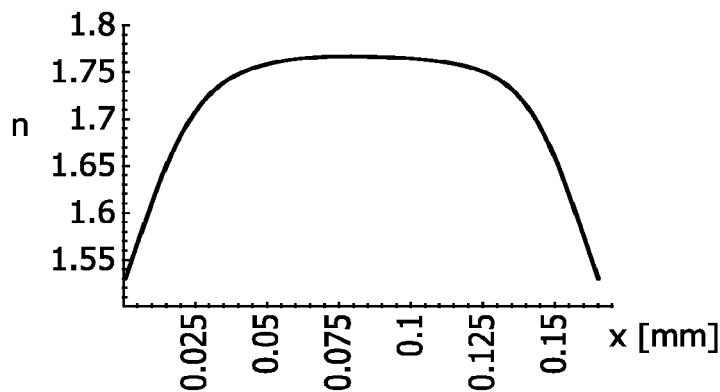
Figure 13B:
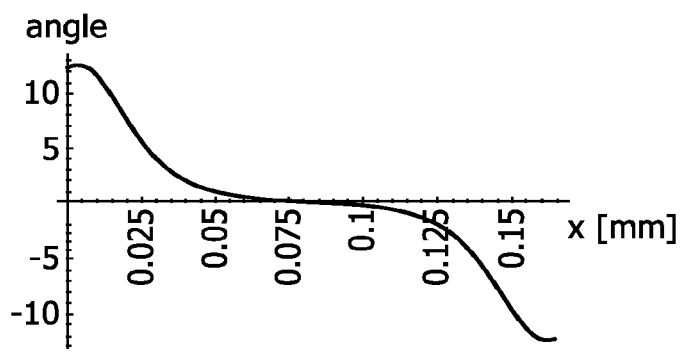

FIGS. 13a-13b shows the lens characteristics (again FIG. 13a shows the refractive index n versus distance x, and FIG. 13b shows the refractive index gradient ("angle") versus distance x) for the reduced thickness lens design of FIG. 11b. The thickness is 40 μm and the electrode spacing is 166 μm. FIGS. 12 and 13 are calculated using an analytical model. The angular distribution as shown in FIG. 13 not only lacks the desired strength (it is also far too strong on the edges), but has strong aberrations in the center as well (the angular distribution should be a straight line in the ideal case).

Thus, there is often a problem that the lens has a focal distance that is too short if a thick LC is used or has too strong aberrations in the center if a thin LC layer is used.

A modification is therefore to increase the focal distance and/or reduce these aberrations to an acceptable level by improving the basic designs above by using one or two layers of material that influence the electric field that is generated within the LC layer.

Figure 14:
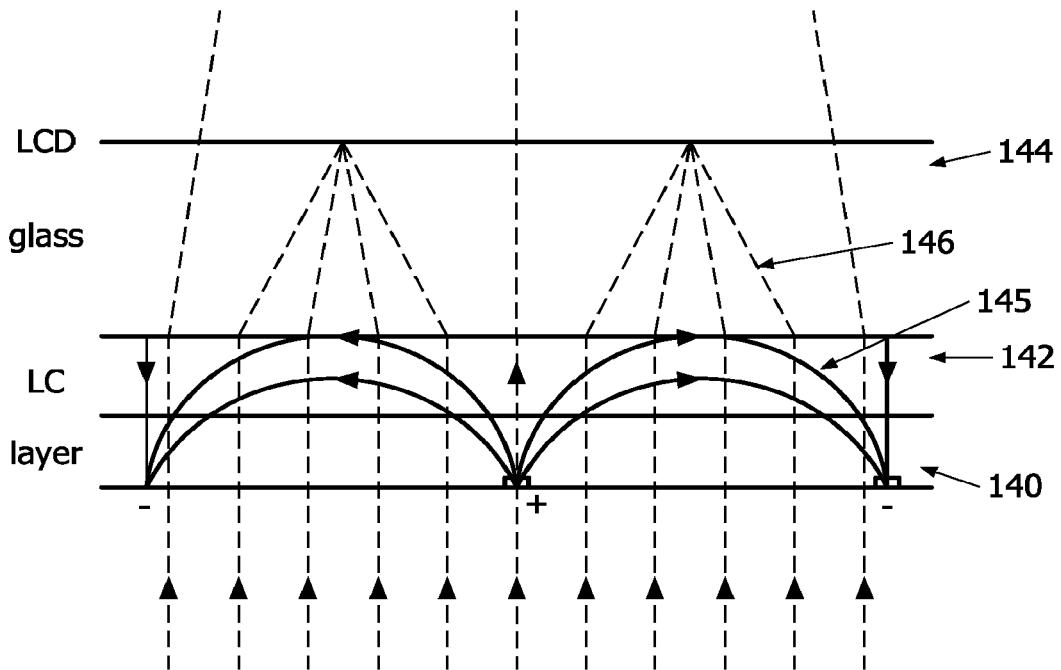
FIG. 14 shows a first example of beam shaping apparatus of the invention for particular use in an autostereoscopic display device.

FIG. 14 shows a first modification in which the part of the liquid crystal layer near the wire structure is replaced with a layer of solid, transparent material.

The structure of FIG. 14 thus comprises an additional layer 140, the LC layer 142 and the glass layer 144 of the overlying LCD.

This additional layer 140 has no direct effect on the direction of the light, because the incident beam travels perpendicular to the replaced layer and there is no gradient in refractive index within the layer. However, the additional layer 140 does have an effect on the electric field distribution in the LC-layer, indirectly influencing the light traveling through the lens.

The magnitude of this effect (and the focal length of the lens) depends on the thickness of the solid additional layer 140, the thickness of the LC layer 142, the permittivity of the solid layer and the parallel permittivity of the LC.

FIG. 14 shows the electric field lines 145 defining the lens shape, and the optical paths 146 through the structure.

Figure 15:
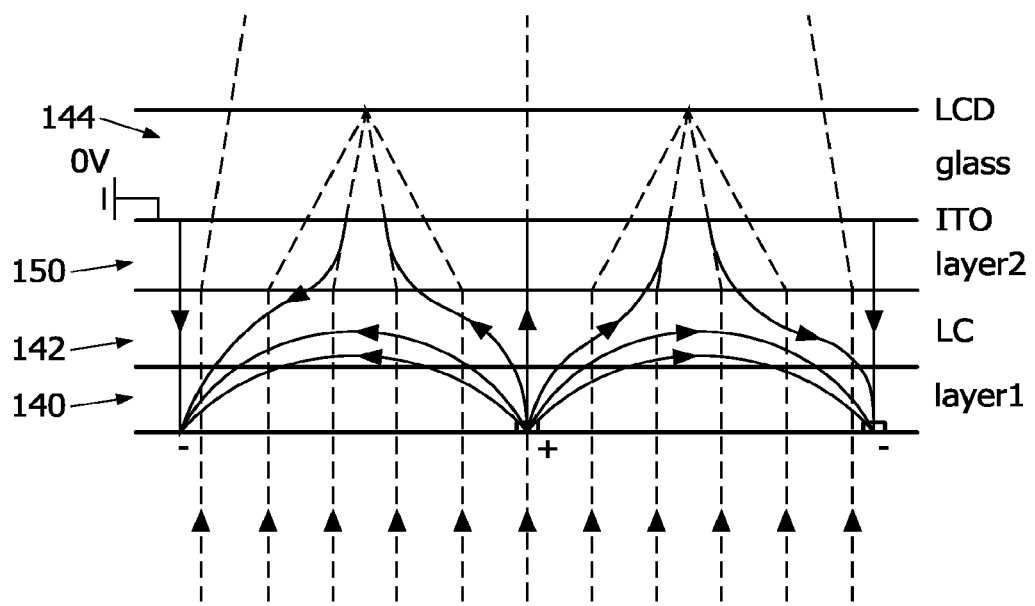
FIG. 15 shows a second example of beam shaping apparatus of the invention for particular use in an autostereoscopic display device.

A further modification uses an additional layer of transparent material 150 in contact with a transparent conductor, such as Indium-Tin-Oxide (ITO), to reduce the lens thickness (and therefore increase its focal length) by effectively compressing the electric field, as shown in FIG. 15. The influence of the transparent material 150, which may be grounded, is that it imposes conditions on the electric field that are beneficial for the field distribution needed in the layer of LC. The additional layer 140 and the transparent material 150 are selected such that the LC layer 142, which may be switchable, is positioned in the required region to implement the lens switching function. The thickness of the layers depends on the permittivity of each material and the desired focal length. Notwithstanding the aforementioned, it will be appreciated by the person skilled in the art that in alternative embodiments, as for example the one described with respect to FIG. 18, the additional layer 140 and/or the transparent material 150 may be omitted according to need and design.

In the aforementioned modifications, the lenses can be made weaker and with small spherical aberrations. The lenses can be designed to have a focal length matching the optical path length from the lens to the pixels.

Figure 16A:
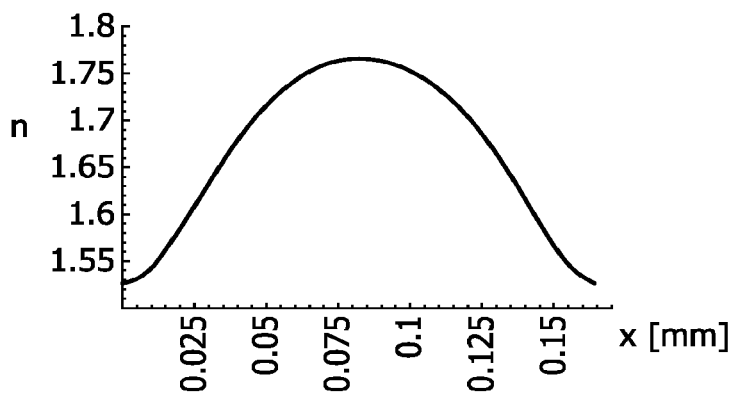
FIGS. 16a-16b and 17a-17b shows the lens properties for the two lens configurations of FIGS. 14 and 15 respectively.
Figure 16B:
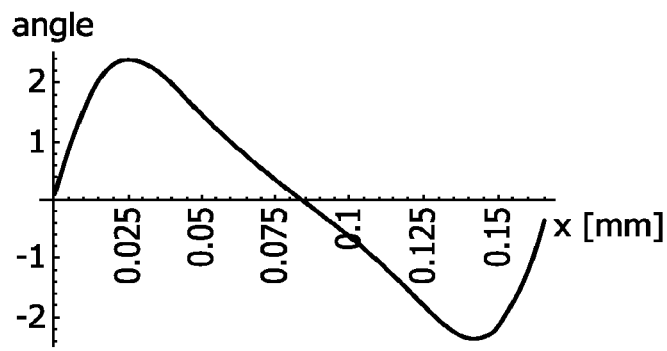
Figure 17A:
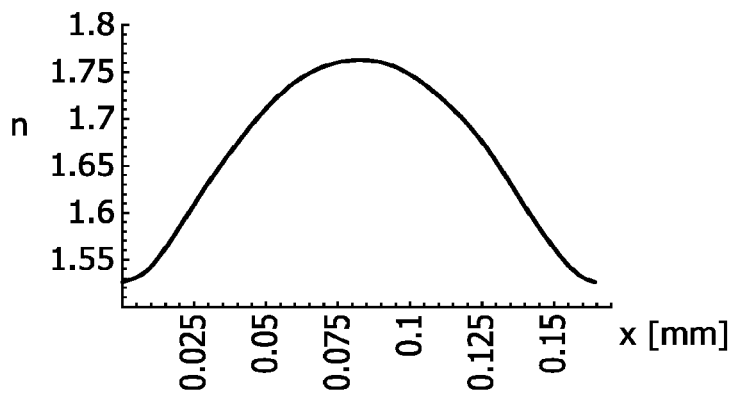
Figure 17B:
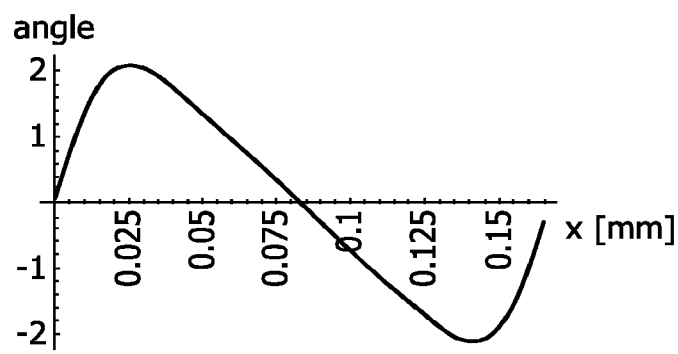

FIGS. 16a-16b and FIGS. 17a-17b show the lens characteristics for two designs of an actual 10 cm display with 9 views. FIGS. 16a-16b are based on the arrangement of FIG. 14 and FIGS. 17a-17b is based on the arrangement of FIG. 15. The variables plotted correspond to those in FIGS. 12 and 13. The focal length, equal to the optical thickness of the different layers, is 1,342 µm in glass (a 615 µm thick glass plate of the display, a 27 µm thick layer of polymer and a 700 µm thick glass plate of the lens-array itself). For this 9 view display, the pixel pitch is 37.5 µm and the lens pitch is 166.36 µm. For the example of FIG. 16, the LC layer thickness is 13 µm, and the thickness of the additional layer 140 is 100 µm. For the example of FIG. 17, the LC layer thickness is 12 µm, the thickness of the additional layer 140 is 61 µm and the thickness of the transparent material 150 on the ITO ground plane is 27 µm.

As can be seen, the shape of the angular distribution for both designs is comparable to that of the distribution shown in FIG. 12. Thus, a lens design is obtained with the desired focal length while keeping the aberrations on an acceptable level.

For the design shown in FIG. 14 with a single additional layer, the key variables are the distance between the wires p, the thickness of the additional layer 140 of solid material $d_{solid}$, the permittivity of the glass in contact with the LC $\varepsilon_{glass}$ and the component of the permittivity of the LC material parallel to the extraordinary axis $\varepsilon_{LC}$.

The lens function is improved based on the ratios between these variables. The key ratios are:

$a1=\varepsilon_{LC} \times d_{solid}/p$ and $a2=\varepsilon_{LC}/\varepsilon_{glass}$ In the calculations used for FIG. 16, a1=3.0 and a2=1.8.

The thickness of the LC layer, $d_{LC}$, depends on the desired focal length f, the difference between the ordinary and extra-ordinary index of refraction ($\Delta n=n_e-n_o$) and the geometry of the design, $d_{LC}\sim p^2/(f \times \Delta n)$ and will range from approximately 5 to 100 µm.

The preferred range for the variable a1 is 0.7<a1<12, more preferably 1.5<a1<6 and more preferably 2.5<a1<4.

The preferred range for the variable a2 is 0.9<a2<3.6.

For the design shown in FIG. 17 using two additional layers, the key variables are the distance between the wires p, the thickness of the layer of solid material near the wire-structure $d_w$, the thickness of the layer of solid material near the grounded ITO layer $d_{ground}$ and the parallel component of the permittivity of the LC-material $\varepsilon_{LC}$. The key ratios are:

$b1=\varepsilon_{LC} \times d_w/p$ and $b2=\varepsilon_{LC} \times d_{ground}/p$.

In the calculations used for FIG. 17, b1=3.6 and b2=1.6.

The thickness of the layer LC, $d_{LC}$, again depends on the desired focal length f, the difference between the ordinary and extra-ordinary index of refraction and the geometry of the design, and will again range from approximately 5 to 100 µm.

The preferred ranges for the variables are:
0.9<b1<14.4 and 0.4<b2<6.4, or more preferably
0.9<b1<14.4 and 0.8<b2<3.2, or more preferably
1.8<b1<7.2 and 0.4<b2<6.4, or more preferably
1.8<b1<7.2 and 0.8<b2<3.2.

The examples above show switching between two different modes, for example between 2D and 3D modes of operation for the example of an autostereoscopic display device. However, there may also be advantages in being able to change the strength of the lens. One way to alter the lens strength is to lower the applied voltage on the fork structure below a threshold where the behavior of the liquid crystal molecules is not dominated anymore by the direction of the electric field. A balance is then formed with the force as a result of interaction with surrounding molecules. The disadvantage of this approach is that it depends on the behavior of the LC and this behavior changes with temperature. Furthermore, the change in lens characteristics is not easily predicted.

A further modification of a device described below changes the lens strength by influencing the direction of the field within the layer of LC. This modification uses a conducting plate, such as transparent material 150 in FIG. 15 (but does not need the additional layer 140), and applies an alternating current to the conducting plate in order to change the electric field and as a result change the strength of the lens. Additional insulating layers may be provided between the electrode fork arrangement and the conducting plate as in the example above.

Figure 18:
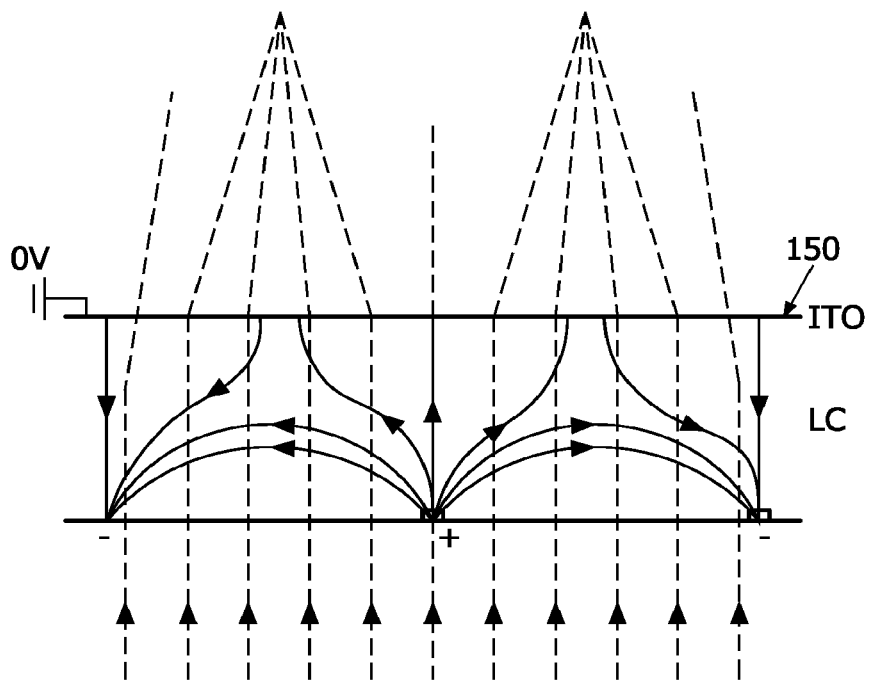
FIG. 18 a third example of beam shaping apparatus of the invention using an additional electrode layer.
Figure 19:
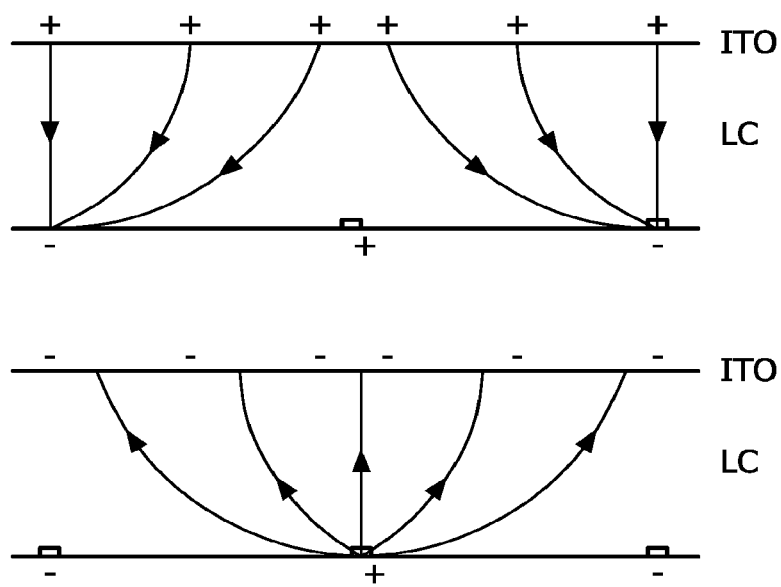
FIGS. 19 and 20 show how the additional electrode layer in the arrangement of FIG. 18 can be used to change electrical fields.
Figure 20:
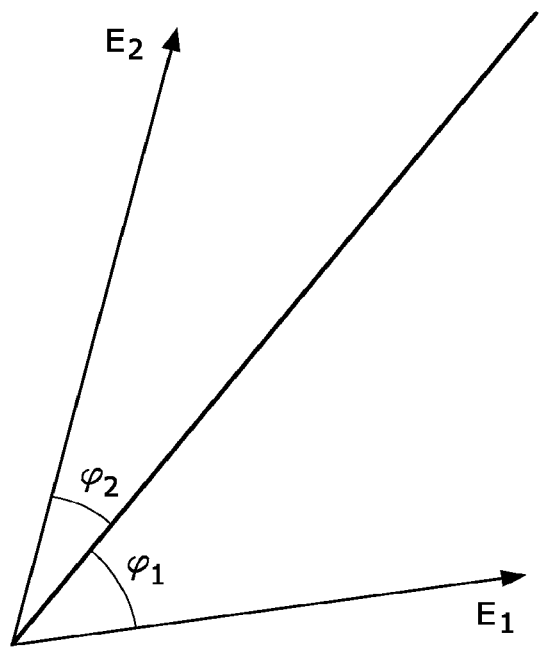

FIG. 18 shows a basic structure of an LC layer and an ITO layer. The thickness of the ITO layer is not shown, and it is represented as a line. The electric field lines before a potential is applied to the conductive plate. The fork structure and the transparent material 150 are supplied with alternating current. When an alternating current is applied to the conducting plate, the electric field starts switching rapidly between the two conditions shown in FIG. 19. If the frequencies of the applied voltages are chosen to be sufficiently high compared to the relaxation time of the liquid crystals (f<<1/$\tau_{LC}$) then the LC molecules will align between the two different electric fields $E_1$, $E_2$ as shown in FIG. 20.

Depending on the voltage applied to the fork, the voltage applied on the plate and the position of the LC layer with respect to the plate and fork, it is possible to change the lens effect significantly. Some different ways of achieving a variable lens effect are shown in FIG. 21.

Figure 21:
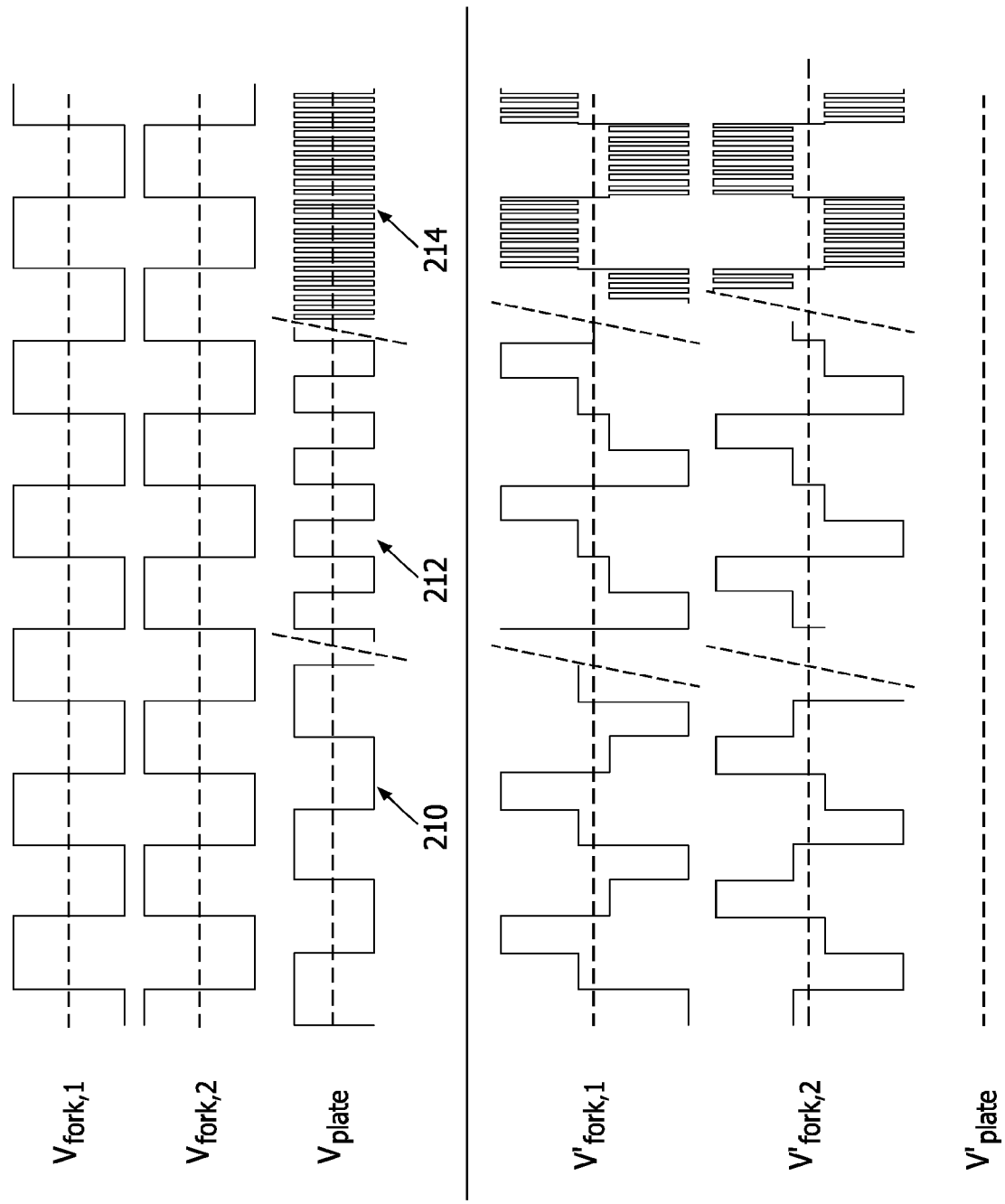
FIG. 21 is used to explain a control method of the invention for controlling the lens properties.

In FIG. 21, the top three plots are based on using opposing voltages on the two forks, $V_{fork,1}$ and $V_{fork,2}$ with a base frequency f. The electric field for this situation is modified by applying a voltage to the conducting plate $V_{plate}$ that either has a phase-shift compared to the fork signals (signal

210), an in-phase signal with a frequency $f_{plate}$ that is twice as high as the base frequency f (signal 212) or a frequency which is much higher than the base frequency (signal 214). These three possibilities are shown in sequence in FIG. 21.

An alternative embodiment shown in the lower three plots of FIG. 21 is to keep $V_{plate}$ equal to zero, by adding a modulation to the signals on the two forks. The same lens effects are obtained, as the difference between each fork voltage and the plate voltage is the same. In this case, each fork signal has superposed onto it an additional signal which has a phase-shift compared to the fork signals, or is an in-phase signal with a frequency $f_{plate}$ that is twice as high as the base frequency for a frequency which is much higher than the base frequency.

Figure 22:
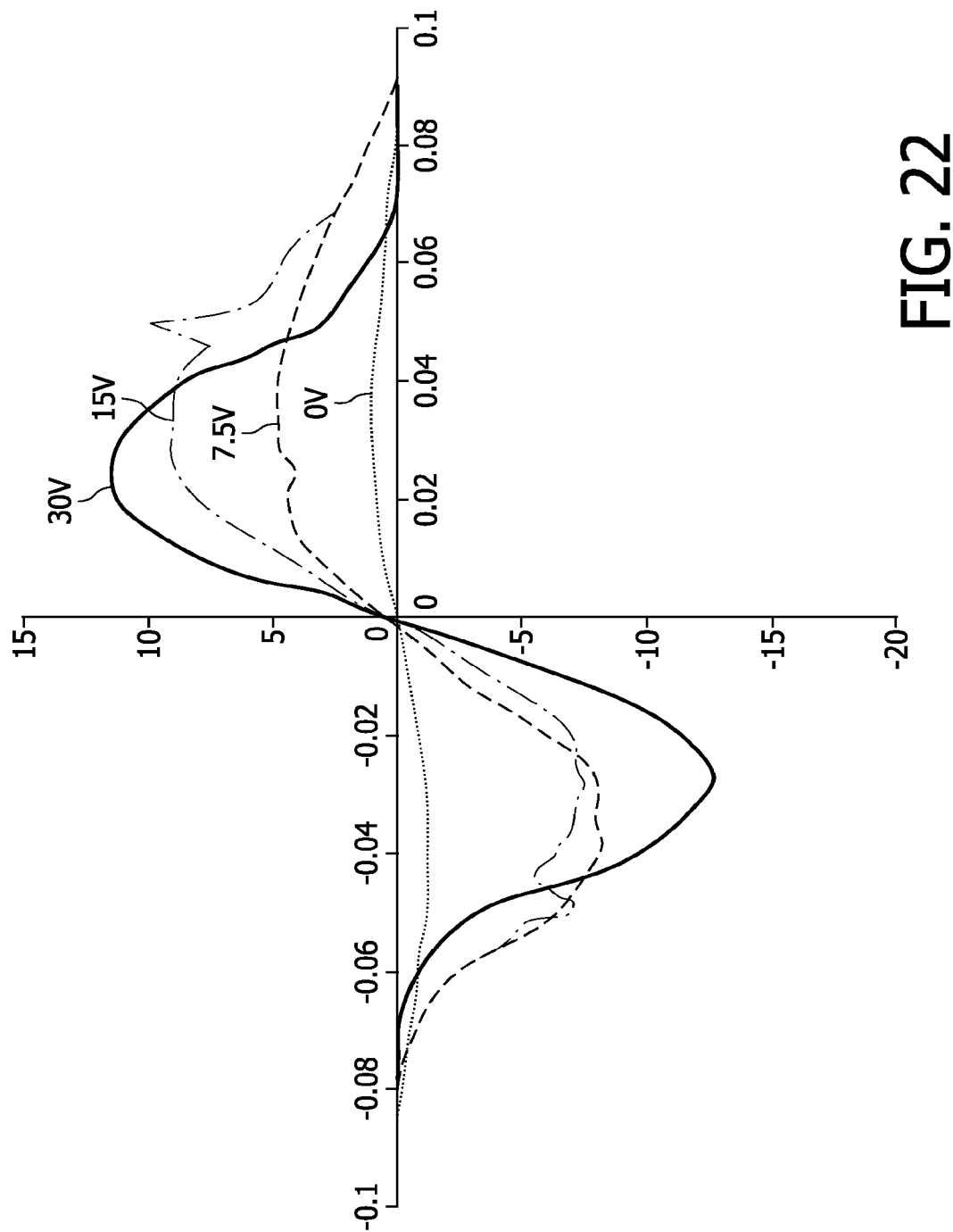
FIG. 22 shows the lens characteristics for different control settings of the method explained with reference to FIG. 21.

FIG. 22 shows different profiles for the angular distribution for a lens with different amplitudes of the applied voltage on the plate $V_{plate}$. The design and specifications of the sample used for the analysis are an electrode pitch 166 μm, LC layer thickness 70 μm, and an additional layer 140 as in FIG. 15 of 82 μm.

The voltages on the plate are applied at 1 kHz. The power source for the fork electrodes is based on $V_{fork}$=50V with frequency $f_{fork}$=100 Hz. The linear part in the middle of each measurement gives an indication for the focal length. The focal lengths for the 0V; 7:5V; 15V and 30V situations are approximately 140 μm; 85 μm; 190 μm and 1330 μm respectively.

As can be seen, the amount of change in lens effect depends on the amplitude of the applied voltage.

Here before, driving of the first and second electrodes in conjunction with the conductor layer has been done such that a symmetrical lens effect is obtained. Thus, for example, with reference to FIG. 18, the first and second electrodes are given opposite and equal voltages V1=−V2, respectively, while the transparent material 150, which is illustratively electrically conductive ITO, is kept at a voltage V3 of 0 V. Conveniently, for an asymmetric lens effect, V3 is different from 0V. Such a voltage scheme provides asymmetric field line distribution and a corresponding asymmetric lens effect, i.e. there is not only a lens effect, but also beam deflection.

Figure 23B:
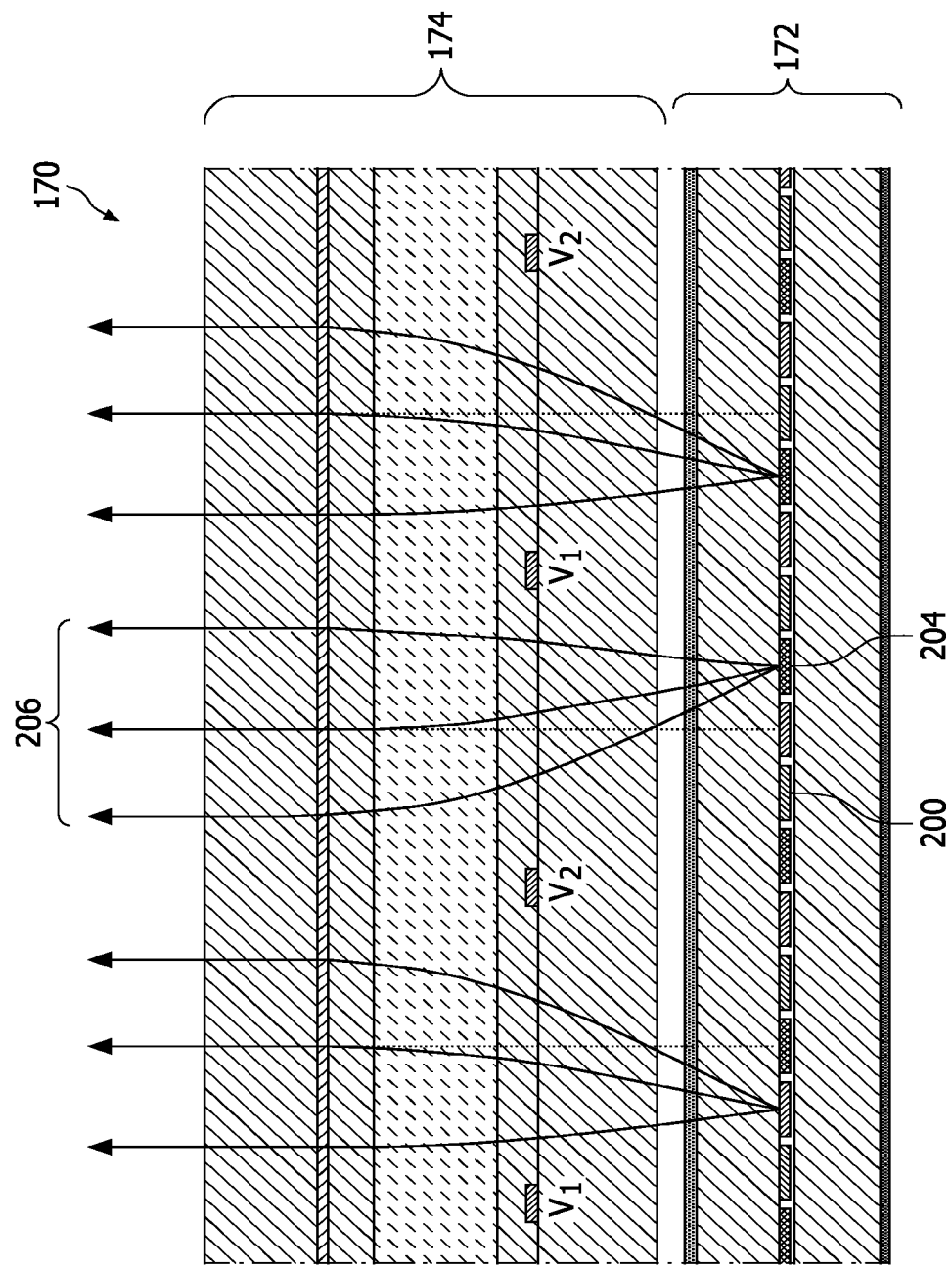
Figure 23C:
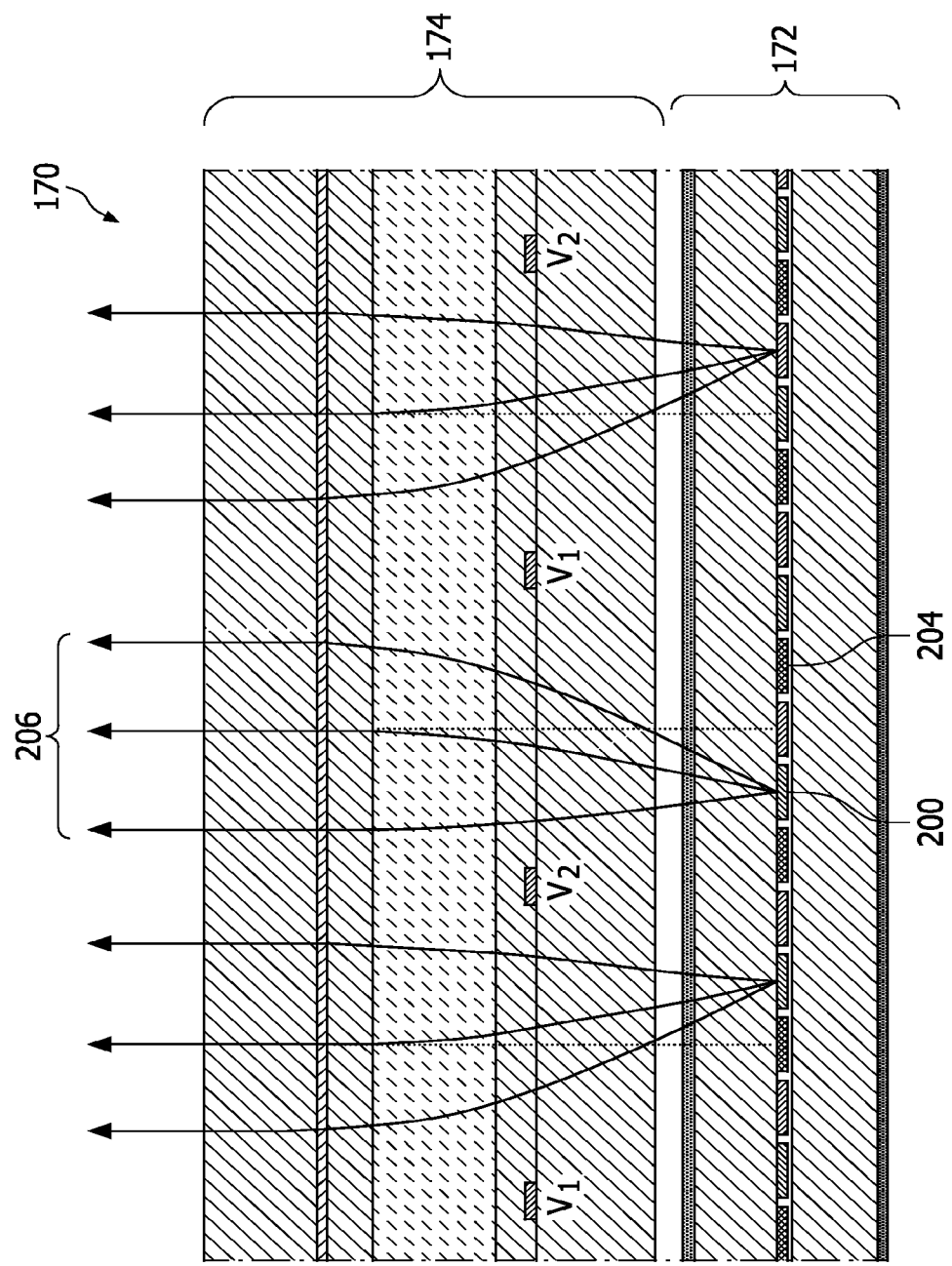

The beam deflection and one possible application in the field of 3D autostereoscopic displays are illustrated in FIGS. 23a, 23b and 23c. The beam shaping device is part of an autostereoscopic display 170. The display comprises a standard LC panel 172, comprising a polarizer 176, a pixel panel 178 and an analyzer 180 held together by glass substrates 182. A backlight (not shown is present beneath polarizer 176. The LCD display is combined with a beam shaping device 174 according to the invention which is to serve as a lenticular array when used in the lensing mode. The beam shaping device in this case comprises first electrodes 184 and second electrodes 186 on a substrate 198. On top of that are present a first insulating layer 188, a thin LC layer 190, a second insulating layer 192 a transparent conducting layer 194 and a substrate 196 of an appropriate transparent material. The pattern of intertwining first and second electrodes on substrate 198 is as shown in 1a. The electrode on substrate 196 is an unstructured electrode that preferably covers the complete substrate. The first and second insulating layers 188 and 192 are optional and may serve the functions described here before for optimization of lens shape. Shown is a 5-view system, i.e. there are 5 sub-pixels such as pixels 202, 203 and 204, underneath each lens of the lenticular, each sub-pixel corresponding to a different view. Like parts in FIGS. 23a, 23b and 23c have like numerals.

During regular 3D operation of the display, to the first electrode a voltage $V_1$ is applied, to the second electrode a voltage V2 of −$V_1$ is applied and to the conductive layer a voltage of $V_3$=0V is applied, such that the light stemming from neighboring pixels 200, 202 and 204 all situated under one cylindrical lens unit present in between two neighboring first and second electrode fingers is sent into different directions, i.e. sent into different views in a symmetrical manner as shown in FIG. 23a.

Alternatively, when $V_3 \neq 0$ V the symmetry of the Field lines and hence that of the associated lens gets broken. The field lines will rearrange themselves such that apart from a lens action also a beam deflection is the result: each view will be deflected somewhat, as depicted in FIGS. 23b and 23c. The direction of this deflection changes sign from lens to lens. The direction also changes sign when changing the sign of voltage $V_3$. In general the effect is obtained when V3 differs from the value that is exactly in between the voltages applied on neighboring first and second electrodes.

By alternating $V_3$ between $\Delta V$ and $-\Delta V$ in subsequent image frames, the individual views will be tilted from left to right and vice versa from frame to frame. This is equivalent to saying that in effect the lenticular is shifted in a virtual manner from left to right and vice versa. Consider the central view 206 for the time being (i.e. the view in a direction perpendicular to the display): underneath each lens, with the method of alternating $V_3$ between $\Delta V$ and $-\Delta V$, two different sub-pixels being 200 or 204, having different colors will contribute to the central view instead of only one: one sub-pixel when $V_3 = \Delta V$ (FIG. 23b) and the other one when $V_3 = -\Delta V$ (FIG. 23c). Thus, in a time-sequential manner, the resolution for each view in the 3D mode of operation is doubled. For example, in case the frame rate is 100 Hz, the lenticular could alternate between two positions: the positions are switched after every 1/100-second. In this manner, the resolution per view can be doubled.

Instead of doubling the resolution per view, it is also possible to triple the resolution per view when the symmetrical configuration of voltages is also used. In that case the pixel 202 is providing the central view in FIG. 23.

The demands on the frame rate are not very high. For example, time-multiplexing by a factor of two in order to double the resolution per view does not necessarily imply that the frame rate has to be doubled. In the case of a frame rate of 50 Hz, images are generated for each of the two positions of the view-forming element at a frame rate of 25 Hz only. Since the images that are generated for the two positions are very similar, in the perception of the viewer the perceived frame rate is still 50 Hz rather than 25 Hz.

Upon shifting the lenticular, the image content for each view should be adapted accordingly.

In roughly the same manner as doubling the resolution per view, it is also possible to double the number of views by tilting the views such that new views are created in between the original views.

There is one drawback of this GRIN beam shaping device forming a lenticular on a display, compared with existing lenticulars, which is that it will reduce the possible contrast for the display in 3D mode as a result of the relative inactive area at the edge of the lenses. The contrast may be retained by using an opaque material where the lens-effect is absent (the lines between the lenses). In fact, also in general for beam shaping devices, aberrations of the lens in the LC region at the location of electrodes will make light beams less perfect. The light stemming from the imperfect parts of the lens may be shielded by an opaque layer. This opaque layer can be a printed layer on either substrate, or a pattern deposited by any suitable technique.

Alternatively, a layer with switchable opaqueness is provided. In one embodiment, an analyzer is present in any of the modifications described here above. The analyzer is situated at the opposite side of the LC layer to the first and second electrodes and is linearly polarizing. In the non-lensing mode of the device, the LC material directors are aligned parallel to the substrates of the device, but perpendicular with respect to each other on either side of the LC layer. The latter type of orientation may be achieved by polyimide alignment layers rubbed in the appropriate perpendicular directions. Thus in the LC layer a gradual rotation of the directors from one orientation to the perpendicular orientation at the other side of the LC layer occurs upon traveling through the LC layer in a direction perpendicular to the substrate. The analyzer is then oriented or rotated such that linearly polarized light, of which the polarization present upon entering of the LC layer has been rotated by the gradual LC director rotation after traveling through the LC layer, exiting the device at the analyzer side is allowed to pass the analyzer, when the device is in its non-lensing mode. Upon driving the device in its lensing mode, at the location of and in the vicinity of the electrodes, the directors will align substantially off parallel and more perpendicularly to the substrates, and will lose their gradual screw like arrangement. Therewith the LC layer loses also its polarization rotating property at these locations such that the light exiting the LC layer is now blocked by the analyzer at these locations. Hence, driving the device in lensing mode, makes the analyzer layer locally opaque for the light traveling through the device. The locations relate to those where aberrations are the largest, i.e. near the electrodes.

The described setup is particularly attractive for application in lenticulars on pixel panel arrangements that emit polarized light, such as an LCD display. The person skilled in the art will then be able to arrange the LC material of the device and the analyzer rotation such that the effect to be achieved is obtained.

In the examples above, the use of two layers to change the lens characteristics has been explained. The structure may have one or both of these layers, and there may be other layers in the structure not mentioned above. The lower layer (additional layer 140) is for reducing the lens strength and the upper layer is for compressing the electric field. These approaches can be used independently to obtain the desired change in the lens characteristics.

The first and second solid insulator layers can be a photoresist. Alternatively, the insulator layers can comprise laminates and PET foil layers or other organic/polymeric layers.

Various modifications will be apparent to those skilled in the art.

Summarizing, a beam shaping device (1; 31) comprising first (3; 33) and second (4; 37) optically transparent substrates, a liquid crystal (lc) layer (2; 36) sandwiched therebetween, and first (5; 34) and second (6; 35) electrodes arranged on a side of the liquid crystal layer (2; 36) facing the first substrate (3; 34). The beam shaping device (1; 31) is controllable between beam-shaping states, each permitting passage of light through the beam-shaping device in a direction perpendicular thereto. The beam shaping device (1; 31) is configured in such a way that application of a voltage (V) across the first (5; 34) and second (6; 35) electrodes results in an electric field having a portion essentially parallel to the liquid crystal layer (2; 36) in a segment thereof between neighboring portions of the electrodes (5, 6; 34; 35) and extending substantially from the first substrate (3; 34) to the second (4; 35) substrate. In this way a relatively high refractive index gradient can be obtained across short distances, which enables a very efficient beam shaping. The electric field can be achieved by utilizing electrodes provided on one side of the liquid crystal layer, in a so-called in-plane configuration. The device can be used in an autostereoscopic display device, for switching between 2D and 3D modes.

It should be noted that the above-mentioned modifications and embodiments illustrate rather than limit the invention, and at that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. A beam shaping device comprising:
top and bottom optically transparent substrates;
a liquid crystal layer sandwiched between the top and bottom optically transparent substrates;
a first electrode arranged on one side of the liquid crystal layer facing the top optically transparent substrate configured as a first plurality of conductor lines connected together and extending in a plane parallel to the top optically transparent substrate;
a second electrode arranged on the one side of the liquid crystal layer facing the top optically transparent substrate configured as a second plurality of conductor lines connected together and extending in the plane formed by the first plurality of conductor lines such that the second plurality of conductor lines are intertwined in the plane with the first plurality of conductor lines of the first electrode, wherein the beam shaping apparatus is controllable to change between a plurality of beam-shaping states; and
a conductor plate extending across the first and second electrodes, coupled to a voltage source and positioned on an opposite side of the liquid crystal layer to the first and second electrodes, each of the first and second electrodes permitting passage of a light beam through the beam shaping device in a direction perpendicular thereto, and is configured to respond to a voltage across the first and second electrodes together with interaction with the conductor plate resulting in an in-plane electric field extending from ones of the first plurality of conductor lines to a neighboring second plurality of conductor lines thereby providing the in-plane electric field that extends essentially parallel to the liquid crystal layer throughout between each of the first and second pluralities of conductor lines including a span directly in line and adjacent to the one side of the liquid crystal layer and extending substantially throughout the liquid crystal layer from the first and second plurality of conductor lines on the one side of the liquid crystal layer to the opposite side of the liquid crystal layer.

2. The beam shaping device according to claim 1, wherein the first and second electrodes are essentially parallel and successively arranged such that at least one conductor pair including neighboring electrode conductor lines from each electrode is formed.

3. The beam shaping device according to claim 2, wherein the first electrode further comprises a second plurality of essentially parallel first electrode conductor lines, and the second electrode comprises a second plurality of essentially parallel second electrode conductor lines, the first and second electrodes being arranged such that at least one conductor pair including neighboring first and second electrode conductor lines is formed.

4. The beam shaping device according to claim 3, wherein the second pluralities of conductor lines are arranged at an angle with respect to the first pluralities of conductor lines.

5. The beam shaping device according to claim 2, further comprising a third electrode configured as a third plurality of conductor lines connected together, and a fourth electrode configured as a fourth plurality of conductor lines connected together and extending in a second plane formed by the third plurality of conductor lines such that the fourth plurality of conductor lines are intertwined in the second plane with the third plurality of conductor lines, arranged on the opposite side of the liquid crystal layer with respect to the first and second electrodes.

6. The beam shaping device according to claim 5, wherein the third and fourth electrodes are arranged such that the third and fourth plurality of conductor lines of the third and fourth electrode are essentially perpendicular with a corresponding plurality of conductor lines of the first and second electrode.

7. The beam shaping device according to claim 1, wherein the liquid crystal layer is homeotropically aligned when not subjected to an electric field.

8. The beam shaping device according to claim 1, wherein the liquid crystal layer has a planar uniaxial alignment such that liquid crystal molecules comprised in the liquid crystal layer are perpendicular to an adjacent conductor line when not subjected to an electric field.

9. The beam shaping device according to claim 1, further comprising a light-source selected from any of a light-emitting diode and a semiconductor laser and configured to emit the light beam through the bottom optically transparent substrate.

10. The beam shaping device as claimed in claim 1, wherein the conductor plate is a first layer, the device further comprising a second layer between the first and second electrodes and the liquid crystal layer,
wherein the second layer is configured to change beam shaping characteristics of the beam shaping device.

11. The beam shaping device as claimed in claim 10, wherein a distance between the first and second pluralities of conductor lines is p, a thickness of the second layer is $d_{solid}$, a permittivity of a substrate in contact with the liquid crystal layer is $\varepsilon_{sub}$ and a component of a permittivity of liquid crystal material parallel to an extraordinary axis is $\varepsilon_{LC}$, and wherein: $0.7<a1<12$, in which $a1=\varepsilon_{LC} \times d_{solid}/p$.

12. The beam shaping device as claimed in claim 11, wherein $0.9<a2<3.6$, in which $a2=\varepsilon_{LC}/\varepsilon_{sub}$.

13. The beam shaping device as claimed in claim 1, wherein the voltage source coupled to the conductor plate is configured to provide a ground potential.

14. The beam shaping device as claimed in claim 13, wherein the conductor plate having a thickness of $d_{solid}$ and further comprising a second insulator layer having a thickness $d_{ground}$, a distance between the first and second pluralities of conductor lines is p and a component of a permittivity of liquid crystal material of the liquid crystal layer parallel to an extraordinary axis is $\varepsilon_{LC}$, wherein: $0.9<b1<14.4$ and $0.4<b2<6.4$, in which $b1=\varepsilon_{LC} \times d_{solid}/p$ and $b2=\varepsilon_{LC} \times d_{ground}/p$.

15. The beam shaping device as claimed in claim 1, wherein the voltage source coupled to the conductor plate is configured to provide a variable voltage to shape the in-plane electric field of the beam shaping device.

16. The beam shaping device as claimed in claim 15, wherein the first electrode is coupled to a first ac voltage and the second electrode is coupled to a second ac voltage.

17. The beam shaping device as claimed in claim 16, wherein the first and second ac voltages are configured to provide voltages in antiphase with the same frequency, and wherein the variable voltage has a different phase or higher frequency.

18. The beam shaping device as claimed in claim 1, wherein the voltage source coupled to the conductor plate is configured to provide a DC voltage, the first electrode is coupled to a first AC voltage, and the second electrode is coupled to a second AC voltage.

19. The beam shaping device as claimed in claim 18, wherein the first and second ac voltages each comprise first and second superposed components, the first superposed components of the first and second AC voltages being in antiphase with the same frequency, and the second superpose components being the same and having a different phase or higher frequency.

20. The beam shaping device as claimed in claim 1, further comprising an opaque layer in a region of the first and second electrodes and aligned with a region of lowest beam shaping effect, the opaque layer being opaque at least when the device is driven in a lensing mode.

21. The beam shaping device as claimed in claim 20, further comprising an analyzer on the opposite side of the liquid crystal layer to the first and second electrodes, the analyzer being configured such that in the lensing mode of the device, light traveling through the device and exiting the liquid crystal layer at the side of the analyzer at a position of electrodes is blocked at least partially by the analyzer.

22. A switchable autostereoscopic display device comprising:
a display panel having an array of display pixel elements for producing a display, the array of display pixel elements being arranged in rows and columns; and
an imaging arrangement which directs an output from different pixel elements to different spatial positions to enable a stereoscopic image to be viewed, arranged such that display pixel outputs for both eyes of a viewer are simultaneously directed,
wherein the imaging arrangement is electrically switchable between a 2D mode and a 3D mode and comprises a beam shaping apparatus comprising:
top and bottom optically transparent substrates,
a liquid crystal layer sandwiched between the top and bottom optically transparent substrates,
a first electrode arranged on one side of the liquid crystal layer facing the top optically transparent substrate configured as a first plurality of conductor lines connected together and extending in a plane parallel to the top optically transparent substrate,
a second electrode arranged on the one side of the liquid crystal layer facing the top substrate configured as a second plurality of conductor lines connected together and extending in the plane formed by the first plurality of conductor lines such that the second plurality of conductor lines are intertwined in the plane with the first plurality of conductor lines of the first electrode, wherein the beam shaping apparatus is controllable to change between a plurality of beam-shaping states, each permitting passage of a light beam through the beam shaping apparatus in a direction perpendicular thereto, and a conductor plate extending across the first and second electrodes, coupled to a voltage source and positioned on an opposite side of the liquid crystal layer to the first and second electrodes, wherein each of the first and second electrodes permitting passage of the light beam through the switchable autostereoscopic display device in a direction perpendicular thereto, and is configured to respond to a voltage across the first and second electrodes together with interaction with the conductor plate resulting in an in-plane electric field extending from ones of the first plurality of conductor lines to neighboring second plurality of conductor lines thereby providing the in-plane electric field that extends essentially parallel to the liquid crystal layer throughout between each of the first and second pluralities of conductor lines including a span directly in line with the first and second pluralities of conductor lines adjacent to the one side of the liquid crystal layer and extending substantially throughout the liquid crystal layer from the first and second plurality of conductor lines on the one side of said liquid crystal layer to the opposite side of the liquid crystal layer.

23. The beam shaping device according to claim 22, wherein the first and second electrodes are essentially parallel and successively arranged such that at least one conductor pair including neighboring electrode conductor lines from each electrode is formed.

24. The beam shaping device according to claim 22, further comprising a third electrode configured as a third plurality of conductor lines connected together, and a fourth electrode configured as a fourth plurality of conductor lines connected together and extending in a second plane formed by the third plurality of conductor lines such that the fourth plurality of conductor lines are intertwined in the second plane with the third plurality of conductor lines, arranged on the opposite side of the liquid crystal layer with respect to the first and second electrodes.

25. The beam shaping device according to claim 24, wherein the third and fourth electrodes are arranged such that the third and fourth plurality of conductor lines of the third and fourth electrode are essentially perpendicular with a corresponding plurality of conductor lines of the first and second electrode.

26. The beam shaping device according to claim 22, wherein the liquid crystal layer is homeotropically aligned when not subjected to an electric field.

27. The beam shaping device according to claim 22, wherein the liquid crystal layer has a planar uniaxial alignment such that liquid crystal molecules comprised in the liquid crystal layer are perpendicular to an adjacent conductor line when not subjected to an electric field.

28. The beam shaping device according to claim 22, further comprising a light-source selected from any of a light-emitting diode and a semiconductor laser and configured to emit the light beam through the bottom substrate.

29. The beam shaping device as claimed in claim 22, wherein the conductor plate is a first layer, the device further comprising a second layer between the first and second electrodes and the liquid crystal layer, wherein the second layer is configured to change beam shaping characteristics of the beam shaping device.

30. A beam shaping device comprising:
top and bottom optically transparent substrates;
a liquid crystal layer sandwiched between the top and bottom optically transparent substrates; and
first and second electrodes arranged on one side of the liquid crystal layer facing the top optically transparent substrate,
wherein the beam shaping device is controllable to change between a plurality of beam-shaping states, each permitting passage of light through a beam-shaping device in a direction perpendicular thereto, and is configured to respond to a voltage across the first and second electrodes resulting in an electric field including a portion essentially parallel to the liquid crystal layer in a segment thereof between neighboring portions of the first and second electrodes and extending substantially from the top substrate to the bottom substrate, and
wherein a distance between neighboring portions of the first and second electrodes is p, a thickness of the liquid crystal layer is $d_{solid}$, a permittivity of one of the top and bottom optically transparent substrates in contact with the liquid crystal layer is $\varepsilon_{sub}$, and a component of a permittivity of liquid crystal material parallel to an extraordinary axis is $\varepsilon_{LC}$, and wherein: $0.7 < a1 < 12$, in which $a1 = \varepsilon_{LC} \times d_{solid}/p$.

* * * * *